US010776268B2

(12) United States Patent
Yoon et al.

(10) Patent No.: US 10,776,268 B2
(45) Date of Patent: Sep. 15, 2020

(54) PRIORITY ADDRESSES FOR STORAGE CACHE MANAGEMENT

(71) Applicant: Western Digital Technologies, Inc., San Jose, CA (US)

(72) Inventors: In-Soo Yoon, Los Gatos, CA (US); Chandrasekar Sundaresan, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 58 days.

(21) Appl. No.: 15/982,805

(22) Filed: May 17, 2018

(65) Prior Publication Data

US 2019/0324903 A1 Oct. 24, 2019

Related U.S. Application Data

(60) Provisional application No. 62/660,123, filed on Apr. 19, 2018.

(51) Int. Cl.
*G06F 12/02* (2006.01)
*G06F 12/0804* (2016.01)

(52) U.S. Cl.
CPC ........ *G06F 12/0804* (2013.01); *G06F 12/023* (2013.01); *G06F 12/0246* (2013.01); *G06F 2212/1044* (2013.01); *G06F 2212/608* (2013.01); *G06F 2212/7203* (2013.01); *G06F 2212/7207* (2013.01)

(58) Field of Classification Search
CPC ............... G06F 12/0804; G06F 12/023; G06F 2212/608; G06F 2212/1044
See application file for complete search history.

(56) References Cited

U.S. PATENT DOCUMENTS

| 6,463,509 B1 | 10/2002 | Teoman et al. |
| 8,499,120 B2 | 7/2013 | Furuhjelm |
| 9,110,813 B2 | 8/2015 | Maharana et al. |
| 9,128,847 B2 | 9/2015 | Ito et al. |

(Continued)

FOREIGN PATENT DOCUMENTS

JP    6098301 B2    3/2017

OTHER PUBLICATIONS

Stevens, Curtis E., "Information technology—ATA/ATAPI Command Set—2 (ACS-2)," Working Draft Project, American National Standard, Revision 7, Jun. 2, 2011, 553 pages.

(Continued)

*Primary Examiner* — Tasnima Matin
(74) *Attorney, Agent, or Firm* — Vierra Magen Marcus LLP

(57) ABSTRACT

Techniques for management of IS memory in a non-volatile storage device, and methods for use therewith, are described herein. The non-volatile storage device can include non-volatile memory, wherein a portion of the non-volatile memory is designated as intermediate storage (IS) memory and another portion of the non-volatile memory is designated as main storage (MS) memory. The IS memory may have lower read and write latencies than the MS memory. A host device may provide priority addresses to a memory controller with an indication that host data having one of the priority addresses is to receive priority to remain in IS memory over other host data.

20 Claims, 16 Drawing Sheets

(56) References Cited

U.S. PATENT DOCUMENTS

| | | | |
|---|---|---|---|
| 9,268,692 | B1 | 2/2016 | Wehman et al. |
| 9,367,258 | B2 | 6/2016 | O'Connor |
| 9,563,382 | B2 | 2/2017 | Hahn et al. |
| 9,645,920 | B2 | 5/2017 | Gole et al. |
| 2004/0143586 | A1* | 7/2004 | Chung .................... G06F 8/656 |
| 2004/0193806 | A1 | 9/2004 | Koga et al. |
| 2008/0168241 | A1 | 7/2008 | Raghavan |
| 2012/0191903 | A1 | 7/2012 | Araki et al. |
| 2013/0042058 | A1* | 2/2013 | Oh ...................... G06F 12/0246 711/103 |
| 2013/0262761 | A1* | 10/2013 | Oh ....................... G06F 3/0659 711/114 |
| 2016/0275017 | A1 | 9/2016 | Takeda |
| 2016/0283390 | A1 | 9/2016 | Coulson |
| 2019/0065085 | A1* | 2/2019 | Jean ..................... G06F 3/0623 |

OTHER PUBLICATIONS

NVM Express, "NVM Express," Revision 1.3a, Oct. 24, 2017, 287 pages.
International Search Report & the Written Opinion of the International Searching Authority dated May 29, 2019, International Application No. PCT/US2019/016713.
English Abstract of Japanese Publication No. JP6098301 published Mar. 22, 2017.

* cited by examiner

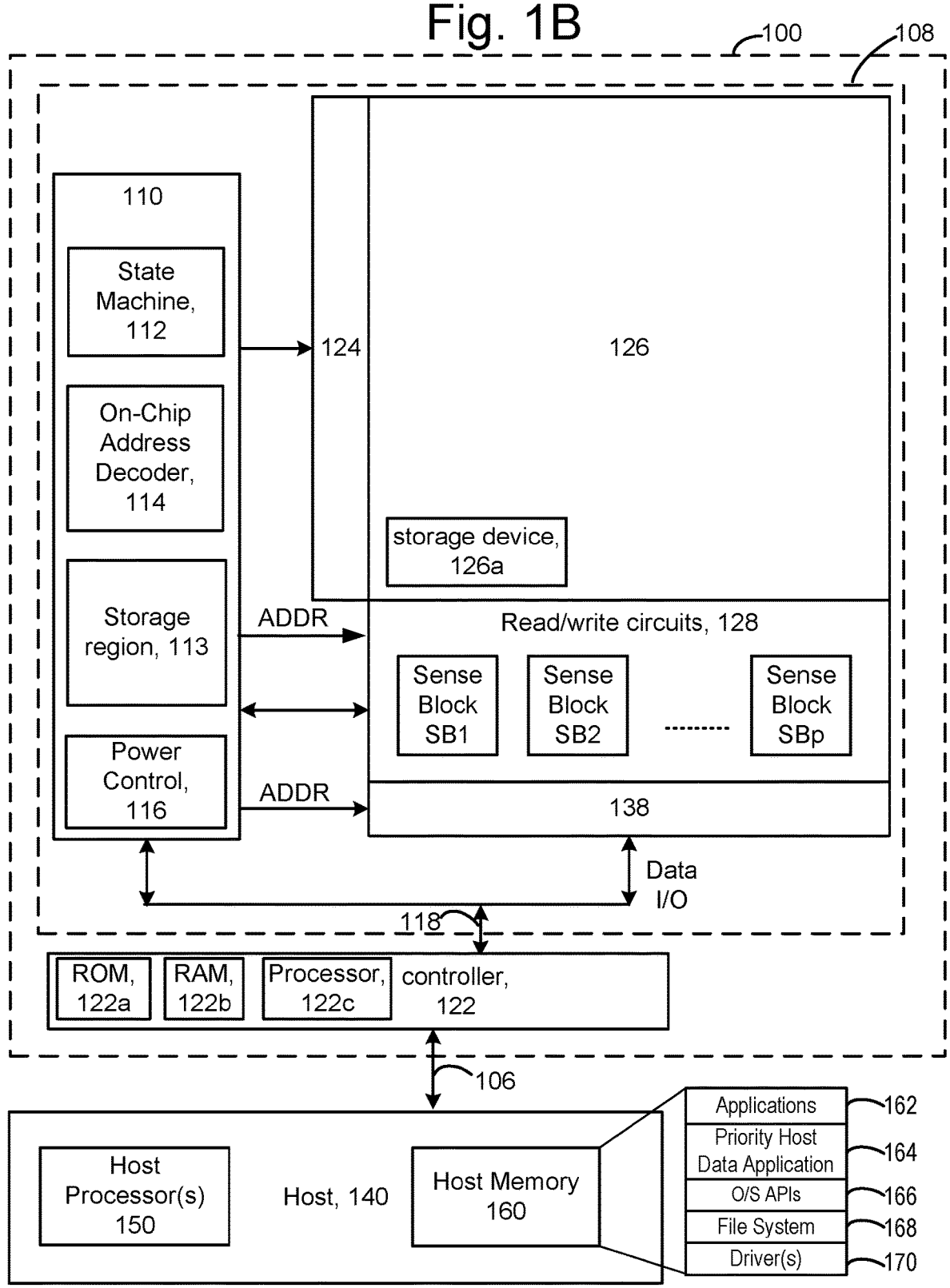

144

| Priority Address | Priority Weight |
|---|---|
| 1000 - 1250 | 1 |
| 1500 – 2000, 2200-2350 | 2 |
| 3500 - 4500 | 1 |
| 7500 - 8250 | 1 |
| 10,575 – 15,115 | 2 |
| 21,000 – 25,420 | 3 |

PRIORITY ADDRESSES FOR STORAGE CACHE MANAGEMENT

CLAIM OF PRIORITY

The present application claims priority from U.S. Provisional Patent Application No. 62/660,123, entitled "STORAGE CACHE MANAGEMENT," by Yoon et al., filed Apr. 19, 2018, incorporated by reference herein in its entirety.

BACKGROUND

A storage device that includes non-volatile memory may include a portion of the non-volatile memory that is designated as intermediate storage (IS) memory and another portion of the non-volatile memory that is designated as main storage (MS) memory. The IS memory may be used in storage devices to provide for faster write throughput, and may also be used as a safe-zone to quickly store host data prior to storing the host data in the MS. The IS memory may also function as a non-volatile memory cache that enables hot data stored within the IS memory to be accessed very quickly. The IS memory could also be referred to as a cache.

The IS memory may have a lower storage density than the MS memory. The IS memory may be more expensive per bit than the MS memory. The IS memory may have greater endurance than the MS memory. In some architectures, the total storage capacity of the IS memory may be significantly less than the MS memory. For example, the more expensive IS memory might take up less than ten percent of a total storage budget of a storage device.

As one example, IS memory can include single-level cell (SLC) memory wherein a single bit of data is stored per memory cell. The SLC memory can be flash memory cells. The IS memory can alternatively, or additionally, include storage class memory (SCM). Examples of SCM in this context are ReRAM, Phase-Change Memory (PCM), or Magnetic RAM. By contrast, the less expensive MS memory, which will likely take up more than ninety percent of the total storage budget, can include multi-level cell (MLC) memory wherein two or more bits are stored per memory cell. The MLC memory can be flash memory cells. MLC memory, as the term is being used herein, can include memory cells wherein two, three or four bits of data, or potentially even more than four bits of data, are being stored per memory cell. Accordingly, as the term is being used herein, the term MLC memory also encompasses triple-level cell (TLC) memory and quad-level cell (QLC) memory.

Note that since the IS memory may have lower write latencies than the MS memory, host data may initially be written to the IS memory. However, due to the limited storage capacity of the IS memory, host data is typically relocated from IS memory to MS memory to free up space in the IS memory. The process of transferring data from the IS memory to the MS memory is called "relocation." Conventional techniques for performing relocation are typically based on simple heuristics, such as first-in first-out (FIFO), or based on an aging algorithm.

BRIEF DESCRIPTION OF THE DRAWINGS

FIG. 1B is a block diagram of a non-volatile memory device such as the 3D stacked non-volatile memory device of FIG. 1A.

FIG. 5A depicts one embodiment of a priority address table.

DETAILED DESCRIPTION

Figure 1A:
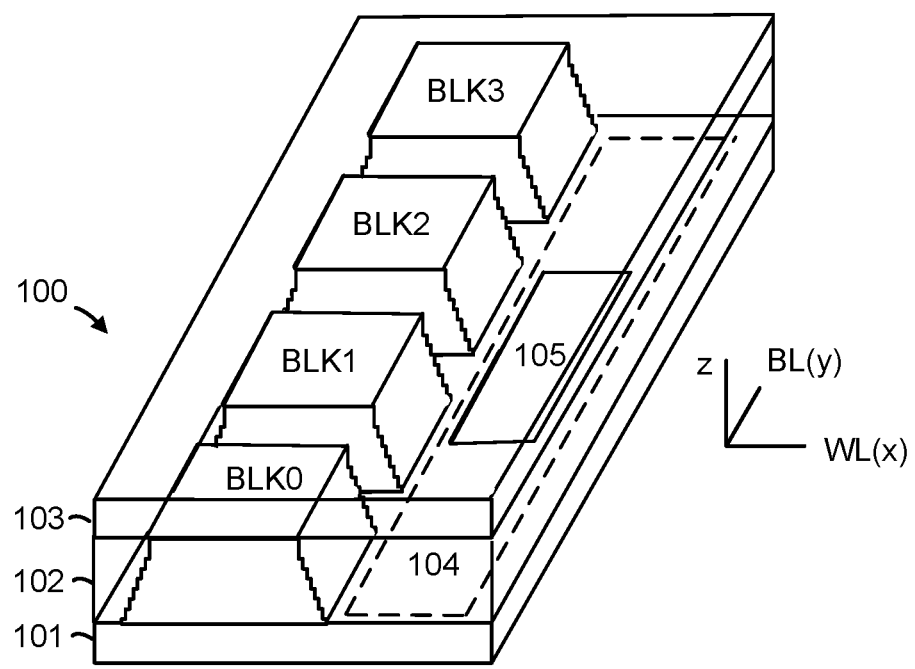
FIG. 1A is a perspective view of a set of blocks in a 3D stacked non-volatile memory device.

Techniques for management of IS memory in a non-volatile storage device, and methods for use therewith, are described herein. Such management techniques could also be referred to as storage cache management, as the IS memory can also be referred to as cache. The non-volatile storage device can include non-volatile memory, wherein a portion of the non-volatile memory is designated as intermediate storage (IS) memory and another portion of the non-volatile memory is designated as main storage (MS) memory. The IS memory has lower a write latency than the MS memory, in one embodiment. The IS memory has a lower read latency than the MS memory, in one embodiment. For example, the IS memory can include single-level cell (SLC) type flash memory wherein a single bit of data is stored per memory cell, and the MS memory can include multi-level cell (MLC) type flash memory wherein two or more bits of data are stored per memory cell. The IS memory is not limited to flash memory. For example, the IS memory could include, but is not limited to, ReRAM, Phase-Change Memory, or Magnetic RAM. ReRAM, Phase-Change Memory, or Magnetic RAM in this context may be referred to as "storage class memory."

In one embodiment, an apparatus comprises a host device and a non-volatile storage device. The non-volatile storage device has a memory controller and non-volatile memory cells. The memory controller is configured to use some of the non-volatile memory cells as IS memory and other non-volatile memory cells as MS memory, in one embodiment. In general, the host device may provide host data to the memory controller to store in the non-volatile storage device.

Embodiments of a host device provide addresses (e.g., logical block addresses) to a memory controller with an indication that host data having one of the addresses is to receive priority to remain in IS memory over other host data. The addresses may be from a logical address space of the host system. In one embodiment, the host system has a priority host data application that becomes aware of which host data is to receive priority to remain in IS memory of a non-volatile storage device. The priority host data application accesses addresses (e.g., logical addresses) for the host data and provides the addresses to a memory controller with an indication that the memory controller is to give priority to host data having those addresses to remain in the IS memory. The priority host data application may provide the addresses using in-band communication that uses a memory access protocol used to access non-volatile memory on the memory system. The memory controller may store the addresses in a priority address table. The memory controller may manage IS memory based on the priority address table.

Herein, host data that is to receive priority to remain in IS memory is referred to herein as "priority host data." Other host data, which has not been specified as to receive priority to remain in IS memory is referred to herein as "non-priority host data." Herein, an address of "priority host data" is referred to as a "priority address." Herein, an address of "non-priority host data" is referred to as a "non-priority address." The host data address may be a logical address, in which case the terms, "priority logical address" and "non-priority logical address" may be used. The address of the host data is not required to be a logical address.

Note that giving priority to the priority host data to remain does not mean that the non-priority host data cannot be written to the IS memory. The memory controller could write both priority and non-priority to IS memory, and then relocate the non-priority host data to the MS memory. Embodiments of a memory controller relocate non-priority host data from IS memory to MS memory. Embodiments of a memory controller keep priority host data in IS memory (to the extent that space is available in the IS memory) rather than relocating the priority host data to MS memory. Note that even host data that has been in the IS memory for much longer than other host data may remain in IS memory, if the "older" host data is priority host data and the "newer" host data is non-priority host data. This is in contrast to a conventional FIFO technique that may relocate older host data to make room for newer host data.

In accordance with certain embodiments of the present technology, to become aware of the priority host data, the priority host data application provides a user interface, which allows a user to specify which host data is to receive priority to remain in IS memory of a non-volatile storage device. The user might select a file or program to receive priority to remain in the IS memory, which as noted has faster read performance than the MS memory. This may allow read performance to be considered when selecting what host data is to receive priority to remain in the IS memory. The user interface of one embodiment allows the user to provide a priority weight to priority host data. Thus, the user might have several software applications that are to receive priority to remain in IS memory, but with different priority weights in the event that there is not sufficient room in the IS memory for all the applications. In one embodiment, the priority host data application monitors usage of host data to become aware of which host data is to receive priority to remain in IS memory.

There is no need for any modifications to a host device driver, in an embodiment. The priority host data application may, for example, pass a request to an operating system (O/S) application programming interface (API) to send the priority addresses to the memory controller. The O/S API may interface with a file system, which may instruct a device driver to communicate with the memory controller. The device driver may operate per a conventional memory access protocol for communicating with the memory controller. Note that for some computer systems, device drivers cannot be modified, or it is at least very difficult to modify the device driver. Hence, the priority host data application provides a way to make the memory controller aware of priority addresses, without any need to modify a device driver.

Also, the technical solution of embodiments is compatible with existing non-volatile memory access protocols. For example, in one embodiment, the NVMe protocol is used as a memory access protocol for the host system to access the IS memory and MS memory in the non-volatile storage system. Hence, in one embodiment, the host system has an NVMe host controller (also referred to as an NVMe device driver) and the memory system has an NVMe memory controller, which are each compatible with the NVMe protocol. In this NVMe example, an embodiment of the technical solution is compatible with the NVMe protocol. Note the NVMe is just one example of a memory access protocol.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout.

Technology described herein may be used with a variety of types of non-volatile memory. One example is a three-dimensional (3D) non-volatile memory device. However, embodiments may also be practiced in two-dimensional (2D) non-volatile memory device. FIG. 1A is a perspective view of a set of blocks in a 3D stacked non-volatile memory device 100. The non-volatile memory device 100 may also be referred to herein as a non-volatile memory system 100, or more succinctly as memory system 100. The non-volatile memory device 100 includes a substrate 101. On the substrate are example blocks BLK0, BLK1, BLK2 and BLK3 of memory cells (storage elements) and a peripheral area 104 with circuitry for use by the blocks. For example, the circuitry can include voltage drivers 105 which can be connected to control gate layers of the blocks. In one approach, control gate layers at a common height in the blocks are commonly driven. The substrate 101 can also carry circuitry under the blocks, along with one or more lower metal layers which are patterned in conductive paths to carry signals of the circuitry. The blocks are formed in an intermediate region 102 of the memory device. In an upper region 103 of the memory system, one or more upper metal layers are patterned in conductive paths to carry signals of the circuitry. Each block comprises a stacked area of memory cells, where alternating levels of the stack represent control gate layers. In one possible approach, the control gate layers of each block at a common height are connected to one another and to a voltage driver. While four blocks are depicted as an example, two or more blocks can be used, extending in the x- and/or y-directions.

The length of the plane, in the x-direction, may represent a direction in which signal paths to word lines extend in the one or more upper metal layers (e.g., a word line or drain side select gate (SGD) line direction), and the width of the plane, in the y-direction, represents a direction in which signal paths to bit lines extend in the one or more upper metal layers (e.g., a bit line direction). The z-direction represents a height of the memory device.

FIG. 1B is a block diagram of a non-volatile memory device such as the 3D stacked non-volatile memory device 100 of FIG. 1A. The block diagram may also be used for a 2D non-volatile memory device. Host system 140 has one or more host processors 150 and host memory 160. Host memory 160 may include, but is not limited to, Static Random Access Memory (SRAM) and Dynamic Random Access Memory (DRAM). Commands and data are transferred between the host system 140 and non-volatile memory controller 122 via an interface (e.g., data bus) 106 and between the memory controller 122 and the one or more memory die 108 via lines 118. The interface 106 may also be referred to as a communication interface. Note that "non-volatile memory controller" 122 may be referred to herein more succinctly as "memory controller" or "controller".

The interface 106 between the host system 140 and the memory controller 122 may be any suitable interface. The interface 106 may include a mechanical and/or electrical connection between the host 140 and memory system 100. Examples for the interface 106 include, but are not limited to, Secure Digital (SD), MultiMediaCard (MMC), embedded MultiMediaCard (eMMC), Universal Serial Bus (USB), Serial Advanced Technology Attachment (SATA), Fibre Channel, Small Computer Systems Interface (SCSI), Peripheral Component Interface (PCI), and PCI Express (PCIe). In one embodiment, the interface 106 includes a Peripheral Component Interconnect Express (PCIe) bus. In one embodiment, the memory system 100 and host system 140 communicate over the PCIe bus using a Non-Volatile Memory Express (NVMe) protocol. NVMe is a logical device interface that may be used to access non-volatile storage attached when using a PCIe bus between the host system 140 and the non-volatile memory device 100. However, note that the logical device interface is not limited to NVMe. Other possible logical device interfaces include, but are not limited to, the Advanced Host Controller Interface (AHCI), SATA, SATA Express, MMC, eMMC, USB, Serial Attached SCSI (SAS), Fibre Channel Protocol (FCP), and Universal Flash Storage (UFS).

In one embodiment, the non-volatile memory system 100 may be a card based system, such as a secure digital (SD) or a micro secure digital (micro-SD) card. In an alternative embodiment, the non-volatile memory system 100 may be part of an embedded non-volatile memory device. For example, the non-volatile memory system 100 may be embedded within the host system 140, such as in the form of a solid state disk (SSD) drive installed in a personal computer.

The non-volatile memory device 100 may include one or more memory die 108. The set of blocks of FIG. 1A can be on one memory die 108. The memory die 108 includes a memory structure 126 of memory cells, such as an array of memory cells, control circuitry 110, and read/write circuits 128. In a 3D configuration, the memory structure can include the blocks of FIG. 1A. The memory structure 126 is addressable by word lines via a row decoder 124 and by bit lines via a column decoder 138. The read/write circuits 128 include multiple sense blocks SB1, SB2, . . . , SBp (sensing circuitry) and allow a page of memory cells to be read or programmed in parallel. Typically, a memory controller 122 is included in the same non-volatile memory device 100 (e.g., a removable storage card) as the one or more memory die 108.

Multiple memory elements in memory structure 126 may be configured so that they are connected in series or so that each element is individually accessible. By way of non-limiting example, flash memory systems in a NAND configuration (NAND memory) typically contain memory elements connected in series. A NAND string is an example of a set of series-connected transistors comprising memory cells and select gate transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

Other types of non-volatile memory in addition to NAND flash memory can also be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), phase change memory (e.g., PCRAM), and other semiconductor elements capable of storing information. Each type of memory device may have different configurations. For example, flash memory devices may be configured in a NAND or a NOR configuration.

The memory elements can be formed from passive and/or active elements, in any combination. By way of non-limiting example, passive semiconductor memory elements include ReRAM device elements, which in some embodiments include a resistivity switching storage element, such as an anti-fuse or phase change material, and optionally a steering element, such as a diode or transistor. The phase change material may include a chalcogenide material. One embodiment uses a GeTe—Sb2Te3 super lattice to achieve non-thermal phase changes by changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave. Further by way of non-limiting example, active semiconductor memory elements include EEPROM and flash memory device elements, which in some embodiments include elements containing a charge storage region, such as a floating gate, conductive nanoparticles, or a charge storage dielectric material.

The memory structure 126 can be two-dimensional (2D) or three-dimensional (3D). The memory structure 126 may comprise one or more arrays of memory elements (also referred to as memory cells). In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

The memory structure may comprise a monolithic three-dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three dimensional memory arrays (monolithic or non-monolithic) may be formed on separate chips and then packaged together to form a stacked-chip memory device.

One of skill in the art will recognize that this technology is not limited to the two dimensional and three dimensional exemplary structures described but covers all relevant memory structures within the spirit and scope of the technology as described herein and as understood by one of skill in the art.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a memory controller for memory read-write operations may be located on a separate controller chip and/or on the same substrate as the memory elements.

The control circuitry 110 cooperates with the read/write circuits 128 to perform memory operations on the memory structure 126, and includes a state machine 112, an on-chip address decoder 114, and a power control module 116. The state machine 112 provides chip-level control of memory operations. A storage region 113 may be provided for parameters for operating the memory device such as programming parameters for different rows or other groups of memory cells. These programming parameters could include bit line voltages and verify voltages.

The on-chip address decoder 114 provides an address interface between that used by the host or a memory controller to the hardware address used by the decoders 124 and 138. The power control module 116 controls the power and voltages supplied to the word lines and bit lines during memory operations. It can include drivers for word line layers (WLLs) in a 3D configuration, SGS and SGD select gates and source lines. The sense blocks can include bit line drivers, in one approach. A source side select gate (SGS) is a gate transistor at a source-end of a NAND string, and a drain side select gate (SGD) is a transistor at a drain-end of a NAND string.

In some implementations, some of the components can be combined. In various designs, one or more of the components (alone or in combination), other than memory structure 126, can be thought of as one or more control circuits which are configured to perform the actions described herein. For example, one or more control circuits may include any one of, or a combination of, control circuitry 110, state machine 112, decoders 114/124/138, power control module 116, sense blocks SB1, SB2, . . . , SBp, read/write circuits 128, memory controller 122, processor 122c, and so forth.

The memory controller 122 may comprise a processor 122c and storage devices (memory) such as read only memory (ROM) 122*a* and RAM 122*b*. RAM 122*b* may be, but is not limited to, SRAM and DRAM. The storage devices comprise code such as a set of instructions, and the processor is operable to execute the set of instructions to provide the functionality described herein. Alternatively or additionally, the processor can access code from a storage device region 126*a* of the memory structure, such as a reserved area of memory cells in one or more word lines.

The code is used by the memory controller 122 to access the memory structure 126 such as for programming, read and erase operations. The code can include boot code and control code (e.g., a set of instructions). The boot code is software that initializes the memory controller during a booting or startup process and enables the memory controller to access the memory structure. The code can be used by the memory controller to control one or more memory structures. Upon being powered up, the processor 122*c* fetches the boot code from the ROM 122*a* or storage device region 126*a* for execution, and the boot code initializes the system components and loads the control code into the RAM 122*b*. Once the control code is loaded into the RAM 122*b*, it is executed by the processor 122*c*. The control code includes drivers to perform basic tasks such as controlling and allocating memory, prioritizing the processing of instructions, and controlling input and output ports.

The host memory 160 may be used to store applications 162, a priority host data application 164, O/S APIs 166, a file system 168, and one or more device drivers 170. Note that the reference numeral 166 will be used herein to refer both to the O/S APIs in general and a particular O/S API. Note that all or a portion of applications 162, a priority host data application 164, O/S APIs 166, a file system 168, and one or more device drivers 170 may be stored in non-volatile storage 126. Also note that host memory 160 could include volatile memory, wherein the applications 162, priority host data application 164, O/S APIs 166, and file system 168 are not necessarily maintained in host memory 160 when power is off. The host 140 may contain boot code to load one or more of applications 162, priority host data application 164, O/S APIs 166, file system 168, and/or device drivers 170 from non-volatile storage 126 into host memory 160.

Figure 2:
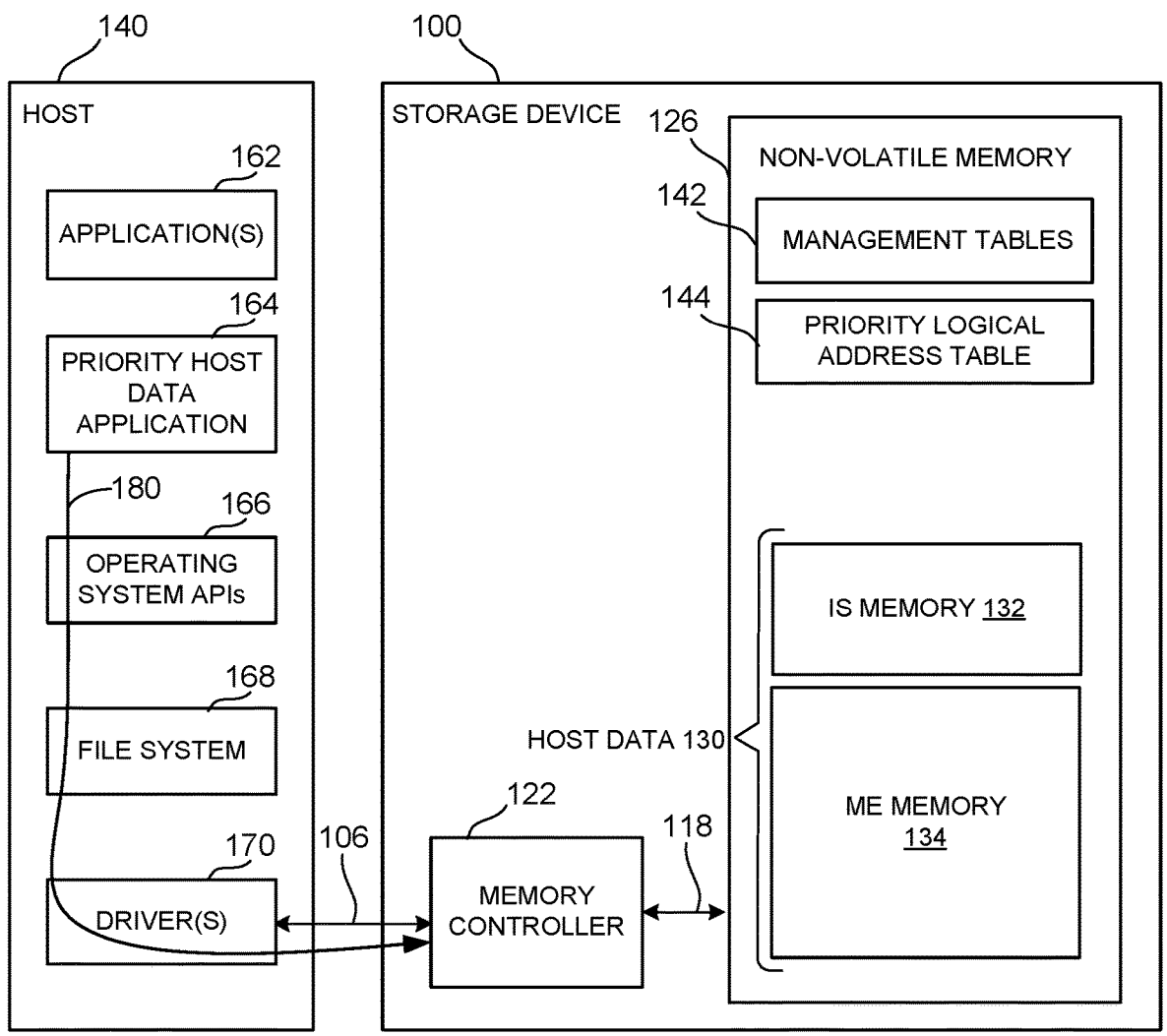
FIG. 2 is a block diagram depicting one embodiment of a non-volatile storage device connected to a host device.

FIG. 2 is a block diagram depicting one embodiment of a non-volatile storage device 100 connected to a host device 140 (or embedded in the host device 140), wherein the host device 140 and/or storage device 100 can implement embodiments of the present technology described below. Non-volatile storage device 100 may be referred to more succinctly as "storage device." Host device 140 may also be referred to as "host system." Referring to FIG. 2, the host device 140 stores data into, and retrieves data from, the storage device 100 by issuing write and read commands. The storage device 100 may be embedded in the host device 140 or may exist in the form of a card, universal serial bus (USB) drive, or other removable drive, such as a solid state disk (SSD) that is removably connected to the host device 140 through a mechanical and electrical connector. The host device 140 may be any of a number of fixed or portable data generating devices, such as a personal computer, a smartphone, a personal digital assistant (PDA), a server, a set top box, or the like. More generally, the host device 140 can include host logic that performs the functions of a smartphone, PDA, laptop, server, set top box, etc. While not specifically shown, the host can include and/or be in communication with read only memory (ROM).

The host device 140 which can be referred to more succinctly as the host 140, may include one or more processors (such as processor(s) 150 in FIG. 1B) that runs one or more application programs 162. The application programs 162, when data is to be stored in or retrieved from the storage device 100, communicate through one or more operating system application programming interfaces (APIs) 166 with a file system 168. The file system 168 may be a software module executed on the processor(s) 150 and manages the files in the storage device 100. The file system 168 manages clusters of host data in logical address space. Common operations executed by a file system 168 include operations to create, open, write (store) data, read (retrieve) data, seek a specific location in a file, move, copy, and delete files. The file system 168 may be circuitry, software, or a combination of circuitry and software. The host device 140 uses the file system 168 to address files stored within the storage device 100, which can involve writing data to and reading data from the non-volatile memory 126 of the storage device 100. Exemplary types of file systems that can be used by the host 140 include, but are not limited to, FAT32, exFAT, ext2/3/4, HFS+, and NTFS. The file system 168 may be a stand-alone chip or software executable by the processor(s) 150 of the host 140. A file system data structure, such as a file allocation table (FAT), may be stored in memory (e.g., 126) of the storage device 100. The host 140 may utilize the file system data structure to maintain a logical address range for all logical block addresses (LBAs) that have been assigned by the host 140 to data.

One or more storage device driver(s) 170 on the host 140 can translate instructions from the file system 168 for transmission over a communication interface 106 between the host 140 and the storage device 100. The communication interface includes an electrical and mechanical interface between the host 140 and memory device 100. The electrical and mechanical interface may include any of a number of known interfaces, such as, Secure Digital (SD), MultiMediaCard (MMC), embedded MultiMediaCard (eMMC), Universal Serial Bus (USB), Serial Advanced Technology Attachment (SATA), Small Computer Systems Interface (SCSI), Peripheral Component Interface (PCI), and PCI Express (PCIe).

The host drivers 170 may also implement the host side of a logical device interface for accessing non-volatile storage 126 in the memory device 100. The logical device interface is sometimes referred to as a host controller. The host drivers 170 could include, but are not limited to, Non-Volatile Memory Express (NMVe), Advanced Host Controller Interface (AHCI), SD, USB, MMC, and eMMC. Note that the memory controller 122, to be discussed below, may implement the non-volatile storage device side of the logical device interface.

The non-volatile memory 126 includes a portion of which is designated as intermediate storage (IS) memory 132 and another portion of which is designated as main storage (MS) memory 134. The IS memory 132 includes a first group of the non-volatile memory cells. The MS memory 134 includes a second group of the non-volatile memory cells. As depicted in FIG. 2, host data 130 can be stored in the IS memory and in the MS memory. One option is for the memory controller 122 to store both priority host data and non-priority host data to IS memory 132 in response to a request from the host 140 to store the host data. At some point in time, the memory controller 122 relocates the non-priority host data from IS memory 132 to MS memory 134, in one embodiment. In some cases, the memory controller 122 could write non-priority host memory directly to MS memory 134, in response to a request from the host 140 to store the non-priority host data.

The non-volatile memory 126 can store management tables 142 and priority address table 144. As will be described in additional detail below, in accordance with certain embodiments of the present technology, the memory controller 122 may use the priority address table 144 to manage whether host data remains in IS memory 132 or is relocated to MS memory 134. In one embodiment, the memory controller 122 relocates (i.e., transfers) data from the IS memory 132 to the MS memory 134, based on the priority addresses in the priority address table 144. In one embodiment, the memory controller 122 performs garbage collection, based on priority address table 144. Garbage collection may include moving priority host data from one location within IS memory 132 to another location in IS memory 132, as well as moving non-priority host data from IS memory 132 to MS memory 134.

In one embodiment, the management tables 142 include one or more L2P (logical to physical mapping) tables and one or more P2L (physical to logical mapping) tables. The controller 122 can use the management tables 142 to map logical block addresses (LBAs) to physical block addresses (PBAs). Such tables 142 can be used to directly map LBAs to the PBAs, or LBAs can be mapped to intermediate or virtual block addresses, which are mapped to PBAs. Other variations are also possible. In some embodiments, the host data 130 is stored in blocks (e.g., Block 0, Block 1, Block 2, . . . ). In some example embodiments, a block of non-volatile memory cells is the unit of erase. In some embodiments, a block represents a plurality of memory cells grouped by common bit lines and word lines. Instructions or commands, such as write commands, that are sent from the host 140 to the storage device 100 over the communication link 106 may include logical block addresses (LBAs). By contrast, instructions or commands that are sent over the communication channel 118 may include physical block addresses (PBAs).

As shown in FIG. 2, host data 130 is stored in both the IS memory 132 and the MS memory 134. Individual blocks (e.g., Block 0, Block 1, Block 2, . . . ) of the host data 130 may be divided for operational purposes into pages of memory cells. The memory cells of each of the blocks, for example, can each be divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage, can for example, be formed of one physical page from each of the four blocks (e.g., a metapage can for example includes the page P2 in each of the four blocks but the pages of a metapage need not necessarily have the same relative position within each of the blocks). A metapage may be the maximum unit of programming.

In accordance with certain embodiments, the IS memory 132 can include single-level cell (SLC) memory wherein a single bit of data is stored per memory cell, which can also be referred to as a storage element or region. More specifically, SLC memory may be operated to store two detectable levels of charge in order to store one bit, which can have one of two possible states: 0 or 1. The IS memory 132 can alternatively, or additionally, include forms of persistent byte-addressable memory including ReRAM, Phase-Change Memory, or Magnetic RAM. By contrast, the less expensive MS memory 134, can include multi-level cell (MLC) memory wherein two or more bits are stored per memory cell. MLC memory, as the term is being used herein, can include memory cells wherein two, three or four bits of data, or potentially even more than four bits of data, are stored per memory cell. Accordingly, as the term is being used herein, the term MLC memory also encompasses triple-level cell (TLC) memory and quad-level cell (QLC) memory. For example, MLC memory may be operated to store four detectable levels of charge that can be used to store four states and can retain two bits of data: 00, 01, 10 or 11. For another example, where the MLC memory is TLC memory, it may be operated to store eight detectable levels of charge that can be used to store eight states and can retain three bits of data: 000, 001, 010, 011, 100, 101, 110 or 111. For still another example, where the MLC memory is QLC memory, it may be operated to store sixteen detectable levels of charge that can be used to store sixteen states and can retain four bits of data: 0000, 0001, 0010, 0011, 0100, 0101, 0110, 0111, 1000, 1001, 1010, 1011, 1100, 1101, 1110, or 1111. The IS memory 132 can be referred to herein more succinctly as the IS 132. Similarly, the MS memory 134 can be referred to herein more succinctly as the MS memory 134.

Still referring to FIG. 2, the IS memory 132 has a lower read latency than a read latency of the MS memory 134, in one embodiment. In such an embodiment, the IS memory 132 can be read from at greater speeds than the MS memory 134 can be read from. The IS memory 132 has a lower write latency than a write latency of the MS memory 134, in one embodiment. In such an embodiment, the IS memory 132 can be written to at greater speeds than the MS memory 134 can be written to. For example, the IS memory 132 may contain flash memory cells that are programmed to one bit per cell (SLC), whereas the MS memory 132 may contain flash memory cells that are programmed to multiple bits per cell. In one embodiment, each MLC cell is programmed to one of four distinct states (e.g., one or four distinct threshold voltage distributions), whereas each SLC cell is programmed to one of two distinct states (e.g., one or two distinct threshold voltage distributions. In one embodiment, each MLC cell is programmed to one of eight distinct states (e.g., one or eight distinct threshold voltage distributions). Typically, a group of memory cells is programmed as one unit, which means that different cells are programmed to the various states. Also, there is typically a smaller gap between the states (e.g., smaller gap between the threshold voltage distributions) for MLC than SLC. These factors lead to a significantly higher write latency for MLC than SLC. A factor in significantly lower read latency for SLC than MLC is that SLC sensing can occur at just one reference level to distinguish between the two states, whereas MLC may require sensing at three or seven reference levels to distinguish between the different states (e.g., threshold voltage distributions). Note that the IS memory 132 and the MS memory 134 could be different types of technology. For example, the IS memory 132 could include ReRAM memory cells, Phase-Change Memory (PCM) memory cells, and/or Magnetic RAM memory cells, whereas the MS memory 134 could be flash (such as but not limited to NAND). In such an embodiment, the ReRAM memory cells, Phase-Change Memory (PCM) memory cells, and/or Magnetic RAM memory cells in the IS memory 132 have a lower read latency than the flash memory cells in the MS memory 134.

Additionally, the IS memory 132 may have greater endurance than the MS memory 134. For example, an expected lifetime of each of the cells of the IS memory 132 may be 20,000 program/erase (P/E) cycles, while the expected lifetime of each of the cells of the MS memory 134 may be 2,000 P/E cycles, in which case the cells of the IS memory 132 would have 10× the endurance of the cells of the MS memory 134. This is just one example, which is not meant to be all encompassing. The IS memory 132 has a lower storage density than the MS memory 134, in one embodiment. More specifically, individual cells of the IS memory 132 may store fewer bits of host data than individual cells of the MS memory 134. In some embodiments, a significantly smaller portion of the non-volatile memory 126 is allocated to the IS memory 132 than is allocated to the MS memory 134. As one example, the IS memory 132 might use less than ten percent of a total storage budget of the storage device 100. As another example, the IS memory 132 might use as little as two percent or less than the total storage budget, depending upon the storage device 100. The exact ratio of the IS memory 132 to the MS memory 134 depends on the specific product, and generally affects the cost versus performance and endurance of the storage device 100.

The IS memory 132 may be used to provide for faster write throughput, and may also be used as a safe-zone to quickly store host data prior to storing the host data in the MS memory 134. The IS memory 132 may also function as a non-volatile memory cache that enables host data stored within the IS memory 132 to be accessed very quickly. The general concept, of one embodiment, is to use more expensive non-volatile memory that has lower write and read latencies, as the IS memory 132, and use less expensive non-volatile memory that has higher write and read latencies as the MS memory 134.

While the IS memory 132 is generally superior in performance, it is too small to effectively cache all host data. Conventional techniques for deciding what host data should be stored in IS memory 132 (as well as relocated from IS 132 to MS storage 134) may be first-in first-out (FIFO), or based on an aging algorithm. However, conventional techniques for performing relocation, which can also be referred to as conventional relocation schemes, are not optimal for many use cases, as there is a clear distinction between what would be an optimal relocation scheme for use in a storage device that is being used for streaming videos, and what would be an optimal relocation scheme for use in a storage device that is being used for repeatedly updating a same relatively small chunk of data. The streaming videos example is an extreme use case, where an entire flash drive is written and then rewritten immediately, time after time. The repeatedly updating of a same relatively small chunk of data, is another extreme use case on the other end of the spectrum, where a same LBA may be written over and over again. There is a large gray area between the above noted extreme case scenarios. Embodiments of the present technology, which will be explained in more detail below, can be used to manage relocation in manners that provides for improved write and read performance compared to when conventional relocation is performed.

Returning again to discussion of the host 140, the priority host data application 164 is aware of what host data 130 (e.g., files) is to receive priority to remain in IS memory 132. In one embodiment, priority host data application 164 monitors usage of host data to learn what host data is to receive priority to remain in IS memory 132. In one embodiment, priority host data application 164 provides a user interface that allows a user to choose what files, or the like, is to receive priority to remain in IS memory 132. Depending on the context, a similar term may be used, such as "priority file," which means a file that has priority to remain in IS memory 132. In one embodiment, the priority is a binary value. Note that the priority can have a weight that is other than a binary value. For example, there may be three or more different weights, with the weight being used to determine what data is stored in IS memory 132.

The priority host data application 164 is able to access addresses (e.g., logical addresses) associated with the host data (e.g., file) to be given priority to remain in IS memory 132. For example, if the host data is a file, then the logical address for the priority file may be contained in metadata for the file. The priority host data application 164 provides a set of priority addresses for the priority host data to the memory controller 122, with an indication that the memory controller 122 is to give the set of priority addresses priority to remain in the IS memory 132. Note that in some embodiments described herein, the priority addresses will be described as being "logical addresses." However, the priority addresses are not required to be logical addresses. For example, in some cases, the priority addresses could be the physical address of the host data in, for example, the storage device 100.

In one embodiment, the priority host data application 164 uses in-band communication of a memory access protocol that is used by a driver 170 and the memory controller 122. The term "in-band communication" as used herein means that the priority logical addresses are provided to the memory controller 122 using the same communication channel that may be used to provide host data to be written to storage device 100, as well as to read host data from storage device. For example, the in-band communication of the priority logical addresses may include using the same memory access protocol (e.g., NVMe, AHCI) that is used to transfer host data between the host 140 and storage device 100.

Path 180 represents a flow of one embodiment of in-band communication. The flow may be similar to the flow discussed above for how application(s) 162 read or write data from/to structure 126. However, the in-band communication does not result in host data 130 being written to or read from structure 126. The in-band communication may include the priority host data application 164 accessing an O/S API 166 to make a request that a communication be sent to memory controller 122. This request could be as simple as a write to a reserved logical address, which the memory controller may determine to be a request to update the priority address table 144. The O/S API 166 may interface with the file system 168 in order to pass along the request. The file system 168 may pass the request along to a driver 170. The driver 170 may include a driver for a memory access protocol such as an NVMe driver, AHCI driver, UFS driver, etc. The driver 170 then forms a suitable communication given the memory access protocol in use and provides the communication to the memory controller 122.

Note that the in-band communication does not require any modification to any driver 170, in one embodiment. As one example, were the priority host data application 164 to request a write to a reserved logical address, this write request could proceed in a similar manner as a write request used by another other application 162. A difference is that when the memory controller 122 receives the write request to the reserved logical address, the memory controller 122 may interpret this as a request to update the priority address table 144, as opposed as a request to write host data 130 to structure 126.

Figure 3:
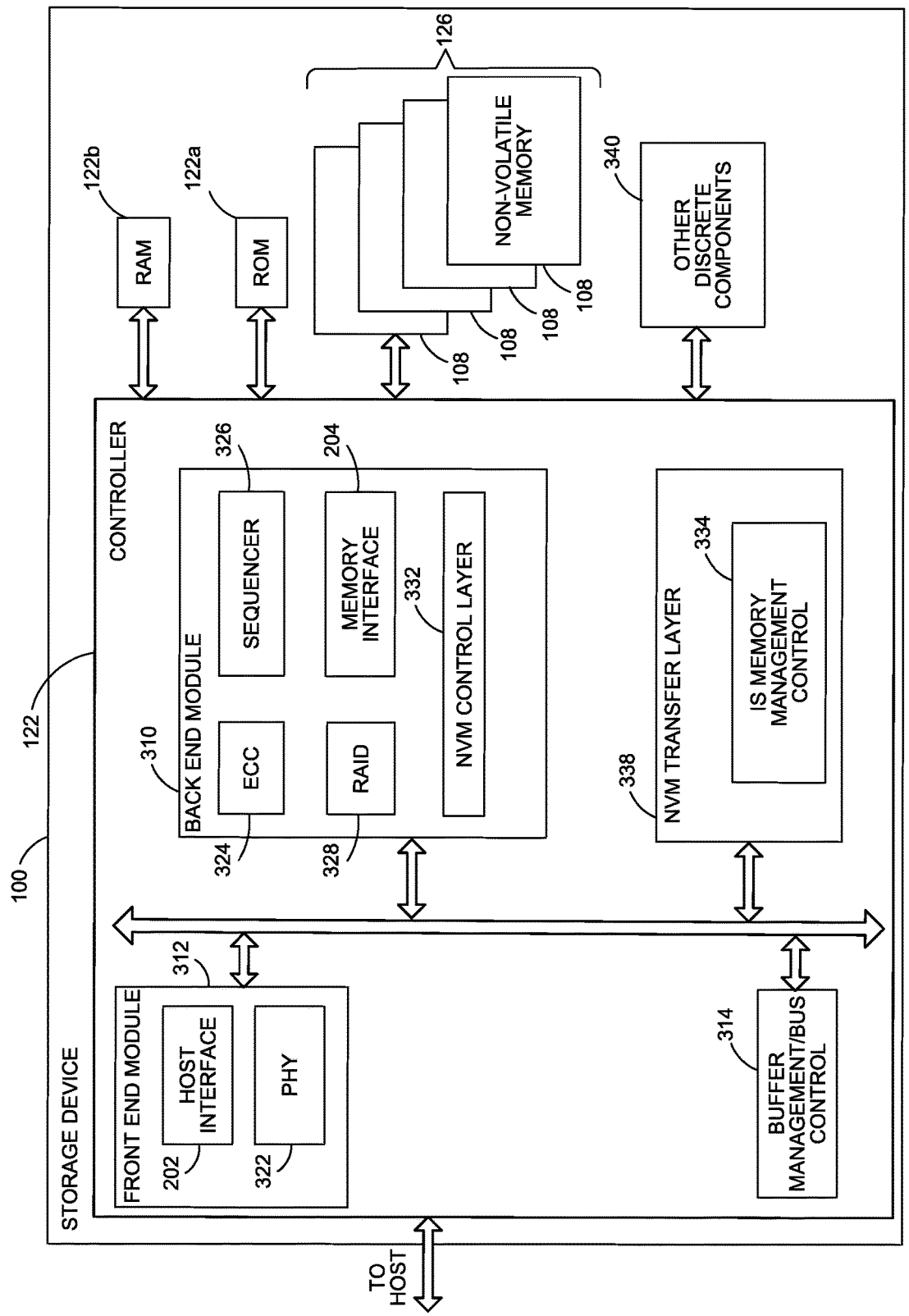
FIG. 3 is a block diagram of one embodiment of a storage device, such as the storage device of FIG. 1A, 1B or 2.

FIG. 3 is a block diagram of one embodiment of the storage device 100. However, the architecture depicted in FIG. 3 can also be used to implement other types of non-volatile storage devices. FIG. 3 shows that the storage device 100 includes the controller 122 connected to one or more non-volatile memory die 108 (which comprise the non-volatile memory 126 depicted in FIGS. 1B and 2). FIG. 3 provides details of some of the components of the controller 122, which will be discussed in more detail below. Depending on the technology used to implement the IS memory 132, the IS memory can be in different non-volatile memory die 108 than the MS memory 134, or a same non-volatile memory die 108 can include some of the IS memory 132 and some of the MS memory 134.

As used herein, for a system that uses non-volatile memory, the controller 122 is a device that manages data stored in the non-volatile memory and communicates with a host. The controller 122 can have various functionality in addition to the specific functionality described herein. For example, the controller 122 can format the non-volatile memory to ensure the memory is operating properly, map out bad memory cells (the physical unit of storage), and allocate spare memory cells to be substituted for future failed cells. Some part of the spare memory cells can be used to hold firmware to operate the controller and implement other features. That firmware can also be read into local volatile memory during operation. When a host needs to read data from or write data to the non-volatile memory, it will communicate with the controller 122. If the host provides a logical address to which data is to be read/written, the controller 122 converts the logical address received from the host to a physical address in the physical memory. The controller 122 can also perform various memory management functions, such as, but not limited to, wear leveling (distributing write operations among memory die or blocks of the memory to avoid wearing out specific blocks of memory that would otherwise be repeatedly written to) and garbage collection (after a block is full, moving only the valid pages of data to a new block, so the full block can be erased and reused).

The interface between the controller 122 and the non-volatile memory die 108 may be any suitable interface, such as PCI Express. When the memory cells are flash memory cells that interface may be Toggle Mode 200, 400, or 800, or another communications interface. In some embodiments, the storage device 100 includes a single channel between the controller 122 and the non-volatile memory die 108; however, the subject matter described herein is not limited to having a single memory channel. For example, in some memory system architectures two, four, eight or more channels may exist between the controller 122 and the memory die 108, depending on controller capabilities. In any of the embodiments described herein, more than a single channel may exist between the controller 122 and the memory die 108, even if a single channel is shown in the drawings.

As depicted in FIG. 3, the controller 122 includes a front end module 312 that interfaces with a host, a back end module 310 that interfaces with the one or more non-volatile memory die 108, and various other modules that perform functions which will now be described.

The components of the controller 122 depicted in FIG. 3 may take the form of a packaged functional hardware unit (e.g., an electrical circuit) designed for use with other components, program code (e.g., software or firmware) executable by one or more processors or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., local volatile memory) to program a processor to perform the functions described herein.

The storage device 100 includes random access memory (RAM) 122*b* (same local volatile memory as discussed above with respect to FIG. 1B) and read only memory (ROM) 122*a*. Referring again to the modules of the controller 122, a buffer manager/bus control 314 manages the RAM 122*b* and controls the internal bus arbitration of the controller 122. The ROM 122*a* stores boot code for the controller. Although illustrated in FIG. 3 as located separately from the controller 122 (but connected to controller 122), in other embodiments one or both of the RAM 122*b* and the ROM 122*a* may be located within the controller. In yet other embodiments, portions of the RAM and the ROM may be located both within the controller and outside the controller. Further, in some implementations, the controller 122, the RAM 122*b*, and the ROM 122*a* may be located on separate semiconductor die. In certain embodiments, instead of storing the potential host activity patterns and associate relocation schemes in the non-volatile memory 126, the potential host activity patterns and associate relocation schemes can be stored in the ROM 122*a*.

The front end module 312 includes the host interface 202 and a physical layer interface (PHY) 322 that provides the electrical interface with the host or next level storage controller. The choice of the type of host interface 202 can depend on the type of memory being used. Exemplary types of the host interfaces 202 include, but are not limited to, SATA, SATA Express, SAS, Fibre Channel Protocol (FCP), USB, MMC, eMMC, UFS, AHCI, and NVMe. The host interface 202 typically facilitates transfer for data, control signals, and timing signals. In one embodiment, the front end module 312 provides the single communication interface adapted to communicate with an external computing device (e.g., host) for the controller 122 and the memory die 108 of the storage device 100.

The back end module 310 includes an error correction code (ECC) engine 324 that encodes the data bytes received from the host, and decodes and error corrects the data bytes read from non-volatile memory die 108. The ECC engine 324 may include circuitry to receive data and generate one or more codewords representing an encoding of the data. For example, the ECC engine 324 may be configured to utilize a Reed-Solomon encoding, a BCH code, a low density parity check (LDPC) code, one or more other error detection and correction codes, or any combination thereof. A command sequencer 326 generates command sequences, such as program and erase command sequences, to be transmitted to the non-volatile memory die 108. A RAID (Redundant Array of Independent Dies) module 328 manages generation of RAID parity and recovery of failed data. The RAID parity may be used as an additional level of integrity protection for the data being written into the non-volatile memory 126. In some cases, the RAID module 328 may be a part of the ECC engine 324. Note that the RAID parity may be added as an extra die or dies, but it may also be added within the existing die, e.g. as an extra plane, or extra block, or extra WLs within a block. The memory interface 204 provides the command sequences to the non-volatile memory die 108 and receives status information from the non-volatile memory die 108. In one embodiment, the memory interface 204 may be a double data rate (DDR) interface, such as a Toggle Mode 200, 400, or 800 interface. An NVM control layer 332 controls the overall operation of back end module 310. In one embodiment, NVM control layer 322 is a flash control layer, During the process of writing data into memory, such as into the IS memory 132, the data may be encoded with extra bits ("parity bits") to form a codeword. In the presence of noise, some of the bits representing the codeword may change, corrupting the original codeword with errors. When the codeword is read from the memory, a decoder may be used to identify and correct the errors using error correction coding (ECC). For example, Bose-Chaudhuri-Hocquenghem (BCH) ECC schemes are used in applications where bit errors tend to be uncorrelated. Relocation of data from the IS memory 132 to the MS memory 134 may be done with or without ECC control. When data is written to the IS memory 132, an error may be introduced to a codeword. If the codeword including an error is relocated from the IS memory 132 to the MS memory 134, without first decoding it and correcting the error, as may be done during an on-chip copy (OCC) operation, the error may turn into a hard error (where MLC type flash memory is programmed using the wrong voltage), which may impair throughput and endurance. In order to reduce the probability and extend of hard errors in the MS memory 134, data that is being relocated from the IS memory 132 can be decoded and error corrected before being re-encoded with parity bits and relocated (i.e., transferred) to the MS memory 134. For example, the memory controller 122 can perform such decoding, error correction, and re-encoding of data, which process can be referred to as copy through controller (CTC). While the use of CTC should reduce hard errors, it will increase relocation latency.

Additional components of the storage device 100 illustrated in FIG. 3 include a Media Management Layer (MML) 338, which performs wear leveling of memory cells of the non-volatile memory die 108. In one embodiment, MML 338 is a Flash Translation Layer (FTL). The storage device 100 also includes other discrete components 340, such as external electrical interfaces (e.g., as part of the host interface and the memory interface), external RAM, resistors, capacitors, or other components that may interface with the controller 122. In alternative embodiments, one or more of the physical layer interface 322, the RAID module 328, the media management layer 338 and the buffer management/bus controller 314 are optional components that are not necessary in the controller 122.

The Flash Translation Layer (FTL) or Media Management Layer (MML) 338 may be integrated as part of the non-volatile memory management that may handle errors and interfacing with the host. In particular, the MML 338 is responsible for the internals of non-volatile memory management. In particular, the MML 338 may include an algorithm in the memory device firmware which translates writes from the host into writes to the memory of a memory die 108. The MML 338 may be needed because: 1) the memory may have limited endurance; 2) the memory may only be written in multiples of pages; and/or 3) the memory may not be written unless it is erased as a block. MML 338 understands these potential limitations of the memory which may not be visible to the host. Accordingly, the MML 338 attempts to translate the writes from host into writes into the non-volatile memory 126, which can be flash memory. The MML 338 also manages the process for mapping between logical addresses from the host and physical addresses on the memory die 108. This can includes updating the L2P tables and the P2L tables during programming, erasing and performing move commands.

The MML 338 is shown as including an intermediate storage (IS) management controller 334, which can also be referred to as the IS manager 334. The IS manager 334 can use the priority address table 144 (depicted in FIG. 2) to manage IS memory 132. This may include determining which host data to store in IS memory 132 and which host data to store in MS memory 134. In one embodiment, IS manager 334 relocates data from IS memory 132 to MS memory 134, based on the priority addresses in the priority address table 144. In one embodiment, IS manager 334 performs garbage collection within IS memory 132, based on the contents of the priority address table 144.

Figure 4:
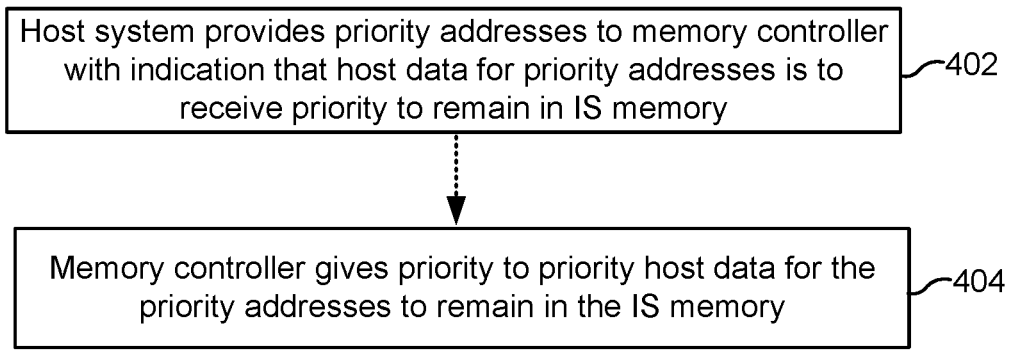
FIG. 4 is a flowchart of one embodiment a process of operating non-volatile storage.

FIG. 4 is a flowchart of one embodiment a process 400 of operating non-volatile storage. The process 400 may be used to manage IS memory 132. The process 400 could be performed by in part by host system 140 and in part by memory controller 122.

Step 402 includes a host system 140 providing priority addresses (e.g., LBAs) to the memory controller 122, with an indication that the host data for the priority addresses is to receive priority to remain in IS memory 132. As noted above, host data that has a priority address is referred to as priority host data. The priority host data is to receive priority over non-priority host data to remain in IS memory 132. In other words, host data associated with the priority addresses is to receive priority to remain in the IS memory 132 over host data associated with any address (e.g., logical address) that the host system has not indicated is a priority address.

Step 404 includes the memory controller 122 giving priority to the priority host data (having the priority addresses) to remain in the IS memory 132. Step 404 may be performed in response to the memory controller 122 receiving the priority addresses from the host system 140. The memory controller 122 gives priority to the priority host data to remain in IS memory 132 over non-priority host data. In one embodiment, step 404 includes flushing non-priority host data (that does not have a priority address) from the IS memory 132 to the MS memory 134. Further details of one embodiment of flushing non-priority host data are shown and described with respect to FIG. 11.

In one embodiment, step 404 includes performing garbage collection based on the priority addresses provided by the host 140. The garbage collection could include transferring non-priority host data from the IS memory 132 to the MS memory 134. The garbage collection could further include moving priority host data from one location in the IS memory 132 to another location in the IS memory 132. Further details of one embodiment of garbage collection are shown and described with respect to FIG. 12.

FIG. 5A depicts one embodiment of a priority address table 144. The table 144 contains sets 502(1)-502(6) of priority addresses, in this embodiment. There are six sets 502(1)-502(6) in this example, but there could be more or fewer. Herein, the reference number "502" will be used to refer to a set in general, without reference to a specific set. Herein, a "set" of priority addresses contains one or more addresses (e.g., logical addresses). The priority addresses in a set 502 are not required to be contiguous. For example, set 502(2) has a gap between priority address 2000 and 2200, wherein priority addresses in the set 502(2) are not contiguous. Each set 502 is provided by the priority host data application 164, in one embodiment.

The embodiment of the priority address table 144 in FIG. 5A has a priority field 504 for priority 504. This allows different sets 502 in the table 144 to have a different priority weight. A higher value in field 504 indicates that the set 502 is to receive a greater priority to remain in IS memory 132.

Note that any address (e.g., logical address) that is not in the table 144 is assumed to have a priority of "0", in one embodiment. Thus, in the example of FIG. 5, set 502(6) has a greater priority than any other set 502(1)-502(5). Sets 502(2) and 502(5) have a lower priority than set 502(6), but a higher priority than sets 502(1), 502(3), and 502(5). Sets 502(1), 502(3), and 502(5) have a higher priority than any addresses address (e.g., logical addresses) not in the table 144.

Note that the priority field 504 is not a requirement. Thus, the table 144 might contain the sets 502, without any priority weight 504 assigned to a given set. In this case, each set 502 in the table 144 may have an equal priority to remain in IS memory 132. Each set 502 in the table 144 has a higher priority to remain in IS memory 132 than any address (e.g., logical address) that is not in the table 144, in this embodiment.

Figure 5B:
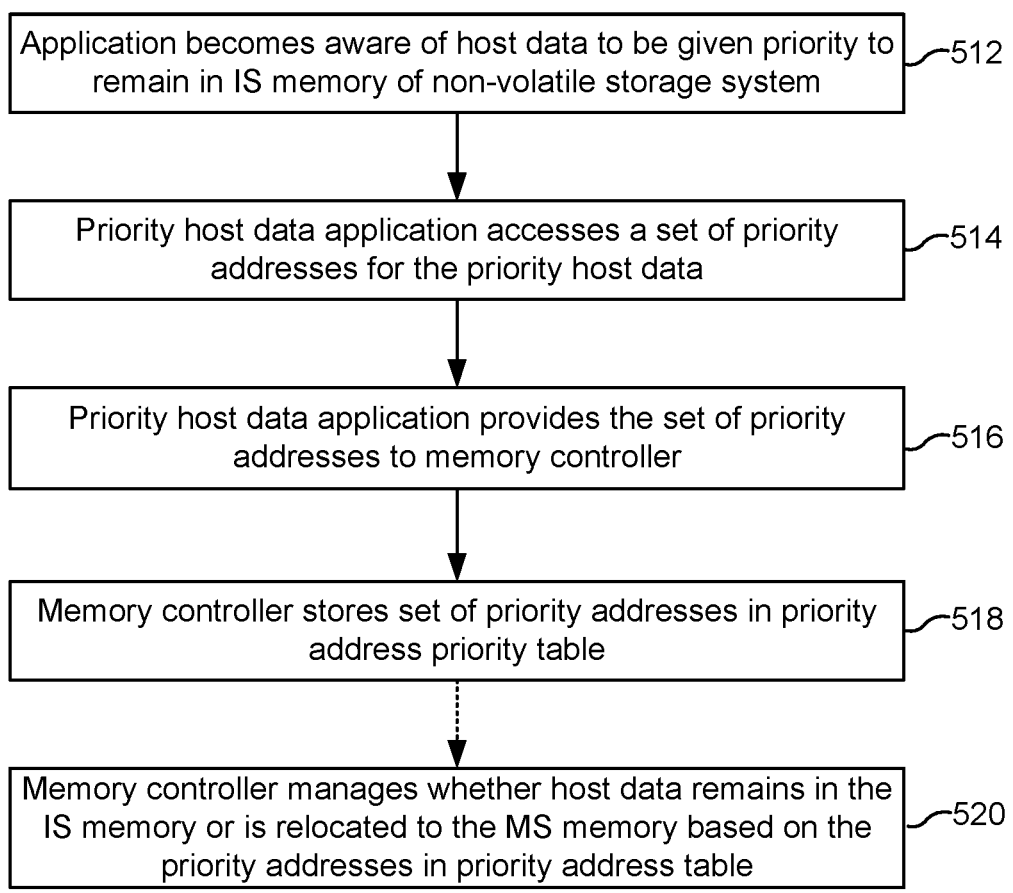
FIG. 5B is a flowchart of one embodiment of a process of operating non-volatile storage.

FIG. 5B is a flowchart of one embodiment of a process 500 of operating non-volatile storage. Some steps of process 500 are performed by a priority host data application 164. The priority host data application 164 executes on a host processor 150. Some steps of process 500 are performed by memory controller 122. Other components such as, for example, operating system APIs 166, file system 168, and one or more device drivers 170 may be used to facilitate communication from the priority host data application 164 to the memory controller 122. Note, however, that it is not required that any changes be made to the operating system APIs 166, the file system 168, and the one or more device drivers 170.

Step 512 includes priority host data application 164 becoming aware of host data that is to be given priority to remain in IS memory 132 of structure 126 of non-volatile storage system 100. The priority host data application 164 might become aware of the host data to receive priority based on its own monitoring. Example embodiments are this are shown and described with respect to FIG. 7. The application might become aware of the host data to receive priority based on user input. Example embodiments are this are shown and described with respect to FIG. 8.

Step 514 includes the priority host data application 164 accessing a set of priority addresses for the host data. The priority host data application 164 may obtain the set of priority addresses for the host data based on metadata. For example, if the set of priority addresses is a file, the file may have metadata that contains the logical addresses for the file.

Step 516 includes the priority host data application 164 providing the set of priority addresses to the memory controller 122. The priority host data application 164 also provides an indication to the memory controller 122 that the set of priority addresses are to receive priority to remain in the IS memory 122. Note that the priority host data application 164 is not required to directly provide the set of priority addresses to the memory controller 122. In one embodiment, the priority host data application 164 sends a request via an operating system API 166. Other components such as a file system 168 and one or more device drivers 170 may be involved with delivery of the set of priority addresses to the memory controller 122. However, it is not required to make any changes to the O/S API 166, file system 168 and/or device drivers 170 in order to deliver the set of priority addresses to the memory controller 122. In one embodiment step 516 includes providing the set of priority addresses to the memory controller using in-band communication that includes communication between a device driver 170 and the memory controller 122 using a memory access protocol. Further details of one embodiment of step 516 are shown and described with respect to FIG. 6A.

Step 518 includes the memory controller 122 storing the set of priority addresses in a priority address table 144. Optionally, the memory controller 122 stores a priority weight 504 for the set of priority addresses in the priority address table 144.

There is a dashed line between step 518 and 520 to indicate that some time may pass between these two steps. Note that steps 512-518 may be performed for other sets of logical addresses. Hence, over time, more sets 502 of priority addresses may be added to priority address table 144. Step 520 includes the memory controller 122 managing whether host data remains in IS memory 132 or is relocated to MS memory 134 based on the priority addresses in priority address table 144.

Step 520 may include determining what host data to flush (or relocate) from IS memory 132 to MS memory 134 based on the priority address table 144. Further details of one embodiment of flushing data from IS memory 132 to MS memory 134 based on the priority address table 144 are shown and described with respect to FIG. 11. Step 520 may include performing garbage collection based on the priority address table 144. Further details of one embodiment of performing garbage collection based on the priority address table 144 are shown and described with respect to FIG. 12.

Figure 6A:
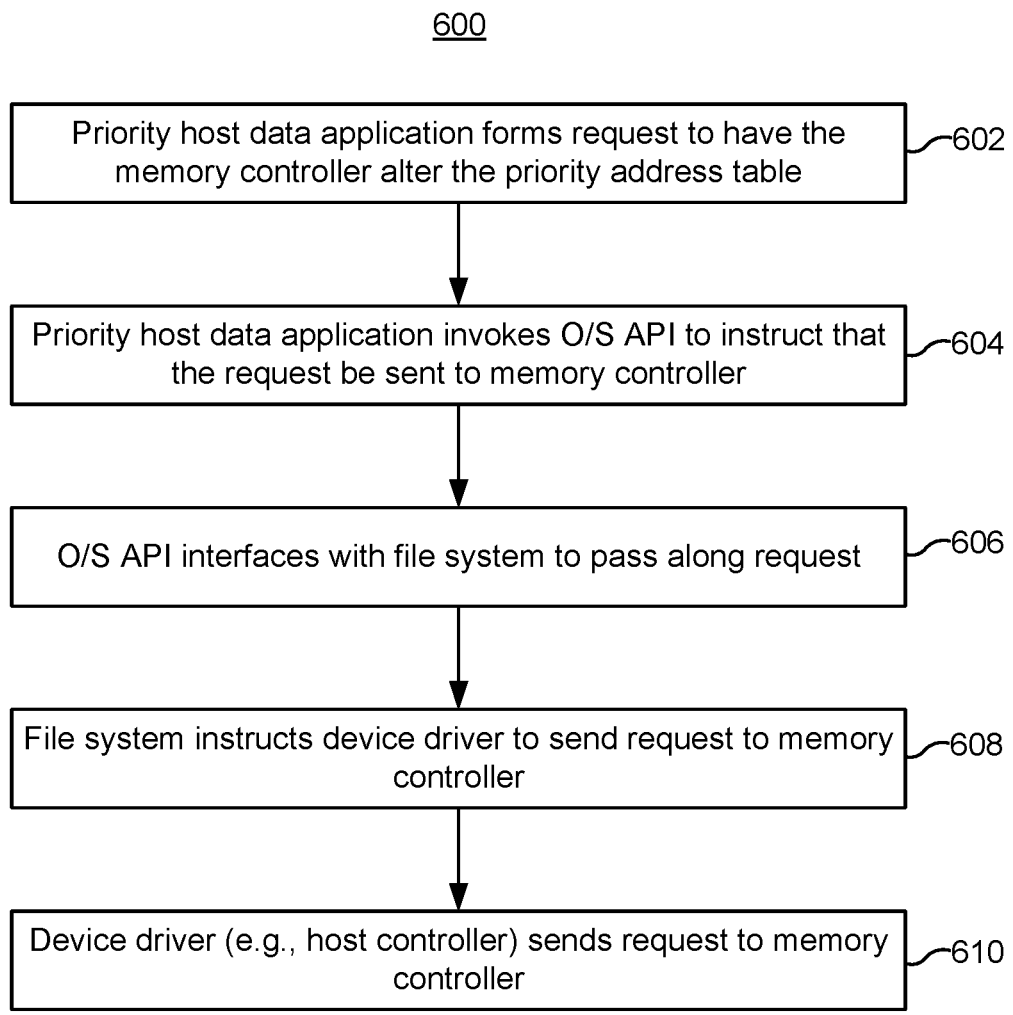
FIG. 6A is a flowchart of one embodiment of a process of a priority host data application providing a set of priority addresses to a memory controller.

FIG. 6A is a flowchart of one embodiment of a process 600 of a priority host data application 164 providing a set of priority addresses to the memory controller 122 with an indication that the set 502 is to receive priority to remain in IS memory 132. Process 600 is one embodiment of step 516 of process 500. Process 600 may be performed by the host system 140.

Step 602 includes the priority host data application 164 forming a request to have the memory controller alter the logical address table 144. The request contains the set of priority addresses. The request may also contain a priority weight for the set of priority addresses.

Step 604 includes the priority host data application 164 invoking an operating system (O/S) application programming interface (API) to instruct that the request be sent to the memory controller 122.

Step 606 includes the O/S API 166 interfacing with the file system 168 to pass along the request.

Step 608 include the file system 168 instructing a device driver 170 to send the request to the memory controller 122. The device driver 170 may itself be made up of more than one device driver. For example, a higher level device driver may interface with the file system, whereas a lower level device driver may interface with the memory controller 122. The lower level device driver is configured to implement the host side of a memory access protocol, in one embodiment. For example, the lower level device driver could implement the host side of an NMVe driver, AHCI driver, SD driver, USB driver, MMC driver, or eMMC driver. These lower level drivers could in some cases be referred to as host controllers. For example, the lower level device driver could be referred to as an NVMe host controller, AHCI host controller, etc. Note that the memory controller 122 has a corresponding controller for implementing the memory system 100 side of the memory access protocol.

Step 610 includes the device driver 170 sending the request to the memory controller 122. The device driver 170 may send the request in accordance with a memory access protocol (e.g., NMVe, AHCI, SD, USB, MMC, eMMC). The device driver in step 610 may be referred to as a host controller.

A variety of techniques may be used to provide the set of priority addresses to the memory controller 122. One possibility is for the device driver to send a write request to write at a pre-determined reserved logical address (e.g., LBA). The reserved logical address may be one that indicates to the memory controller 122 that this is a special write request to update the priority address table 144, as opposed to a request to write host data 130 to structure 126. The data for the write request may contain the set of priority addresses. The data for the write request may also contain a priority weight for the set of priority addresses. Note that this technique does not require any modifications to the device driver. In other words, from the perspective of the device driver, it is simply requesting the memory controller 122 to write to a logical address that was provided to the device driver. Other techniques may be used to provide the set of priority addresses to the memory controller 122.

Figure 6B:
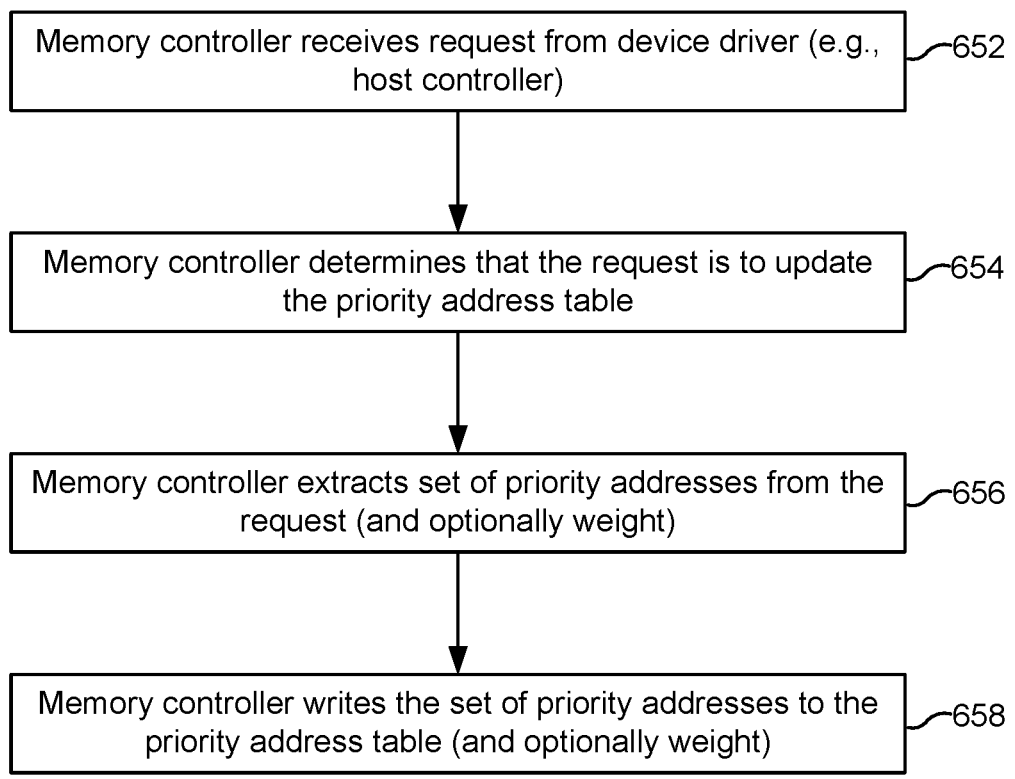
FIG. 6B is a flowchart of one embodiment of process of a memory controller updating a priority address table.

FIG. 6B is a flowchart of one embodiment of process 650 of a memory controller 122 updating a priority address table 144. Process 650 may be used in conjunction with process 600. In other words, memory controller 122 may perform process 650 in response to receiving the request in an embodiment of process 600.

Step 652 includes the memory controller 122 receiving a request from a device driver (e.g., host controller). As noted, this request could be the one from step 610 of process 600. Note that process 650 is not limited to being used with process 600. Thus, the request that the memory controller 122 receives in step 652 could have been sent using a technique other than described in process 600.

Step 654 includes the memory controller 122 determine that this request is a request to update the priority address table 144. In one embodiment, the memory controller 122 makes this determination in response to the request being a write to a reserved logical address. In other words, the memory controller 122 may be configured to interpret requests to write to a certain reserved logical address as a request to update the priority address table 144. However, other techniques may be used.

Step 656 includes the memory controller 122 extracting a set of priority addresses from the request. In one embodiment, the write request indicates data to be written, as well as a length of data. The write request could itself contain the data, or may contain a pointer to the data. Thus, the memory controller 122 may extract the set of priority addresses from a memory location that contains the data for the write request.

Step 658 includes the memory controller 122 writing the set 502 of priority addresses to the priority address table 144. Optionally, the memory controller 122 writes a priority weight 504 for the set 502 to the priority address table 144.

Figure 7:
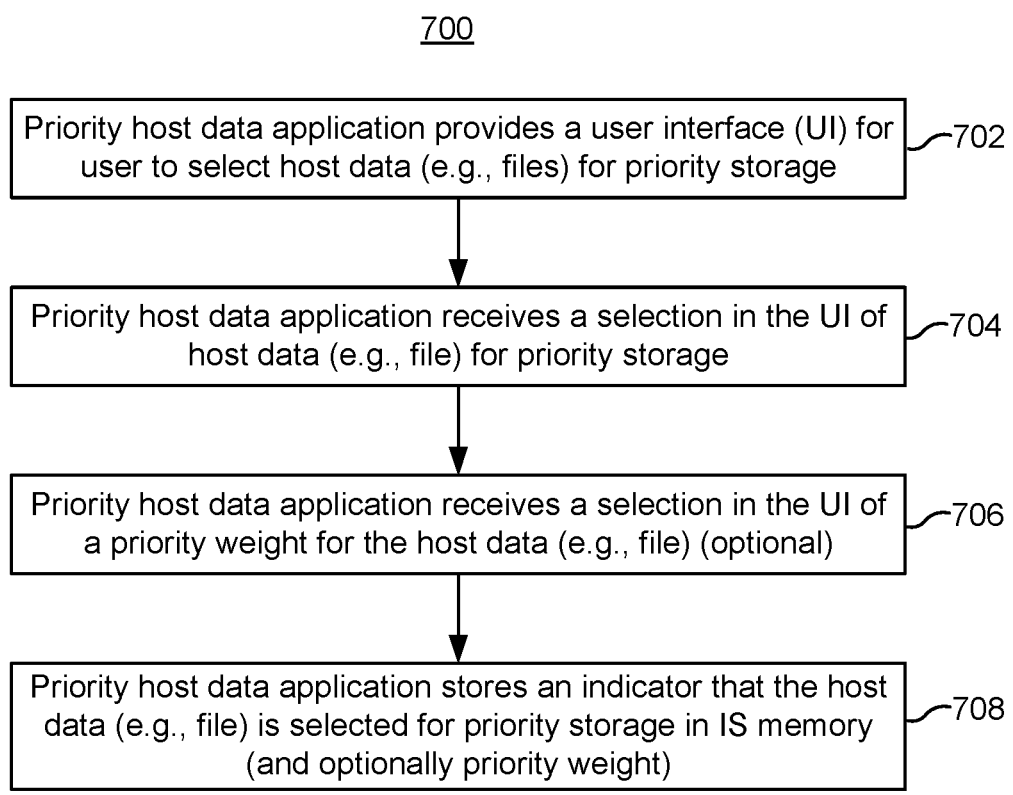
FIG. 7 is a flowchart of a process of a priority host data application learning what host data is to receive priority to remain in the IS memory based on a user selection.

FIG. 7 is a flowchart of a process 700 of a priority host data application 164 learning what host data is to receive priority to remain in the IS memory 132 based on a user selection. Process 700 is one embodiment of step 512 of process 500.

Figure 8A:
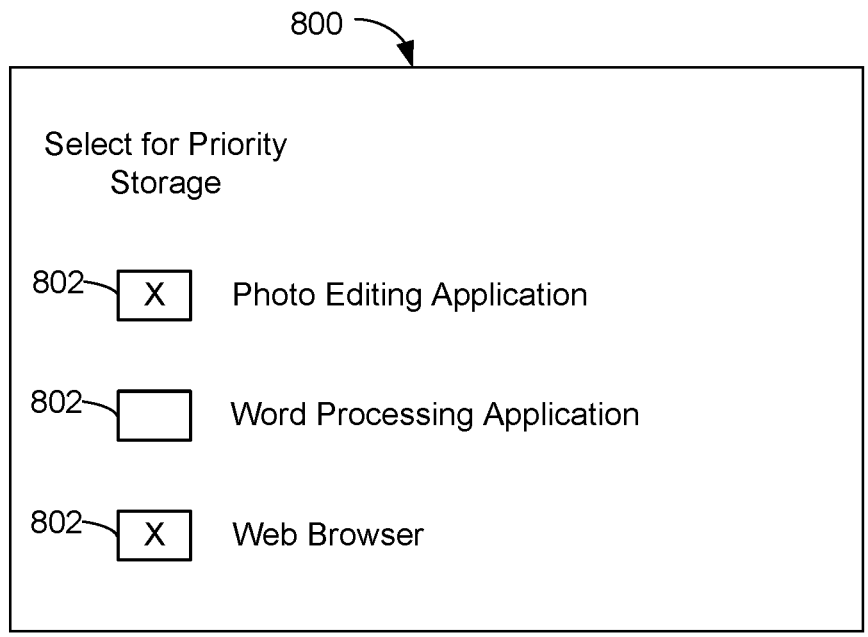
FIG. 8A depicts one embodiment of a user interface (UI) that allows a user to specify priority host data.
Figure 8B:
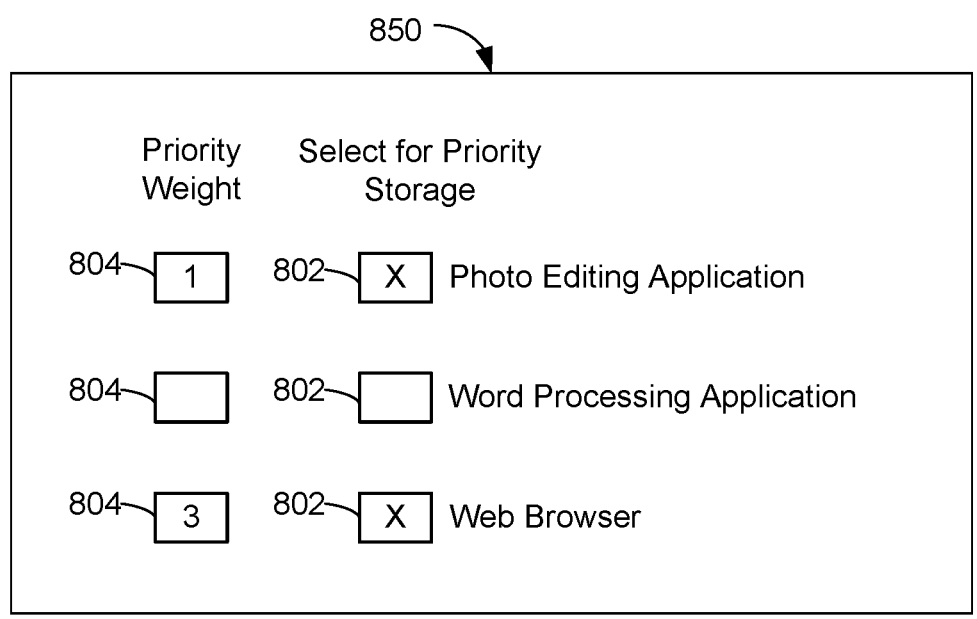
FIG. 8B depicts an embodiment of a UI that allows a user to specify priority host data, along with a priority weight.

Step 702 includes the priority host data application 164 providing a user interface (UI) that allows a user to specify what host data 130 is to receive priority to remain in IS memory 132. FIG. 8A depicts one embodiment of a UI 800 that allows a user to specify priority host data. The UI 800 lists a number of computer programs (or applications). The UI 800 has a priority selection box 802 next to each application that allows the user to select/deselect applications. FIG. 8B depicts an embodiment of a UI 850 that allows a user to specify priority host data, along with a priority weight. The UI 850 also lists a number of applications with a priority selection box 802 next to each one that allows the user to select the application for priority storage. The UI 850 also has a priority weight box 804 next to each application to allow the user to specify a priority weight for applications that have been selected in priority selection box 802.

Step 704 includes the priority host data application 164 receiving a selection in the UI. With respect to the UI 800 in FIG. 8A, the priority host data application 164 notes which priority selection boxes 802 are checked and unchecked. Likewise, with respect to the UI 850 in FIG. 8B, the priority host data application 164 notes which priority selection boxes 802 are checked and unchecked.

Step 706 includes the priority host data application 164 receiving a selection of a priority weight. Step 706 is optional. With respect to the UI 850 in FIG. 8B, the priority address notes the value in the priority weight boxes 804.

Step 708 includes the priority host data application 164 storing information regarding the selections in step 704 and/or 706. Thus, "noting" a selection of a priority selection box 802 or value in a priority weight box 804 refers to storing information into non-transitory storage, such as host memory 160.

Figure 9:
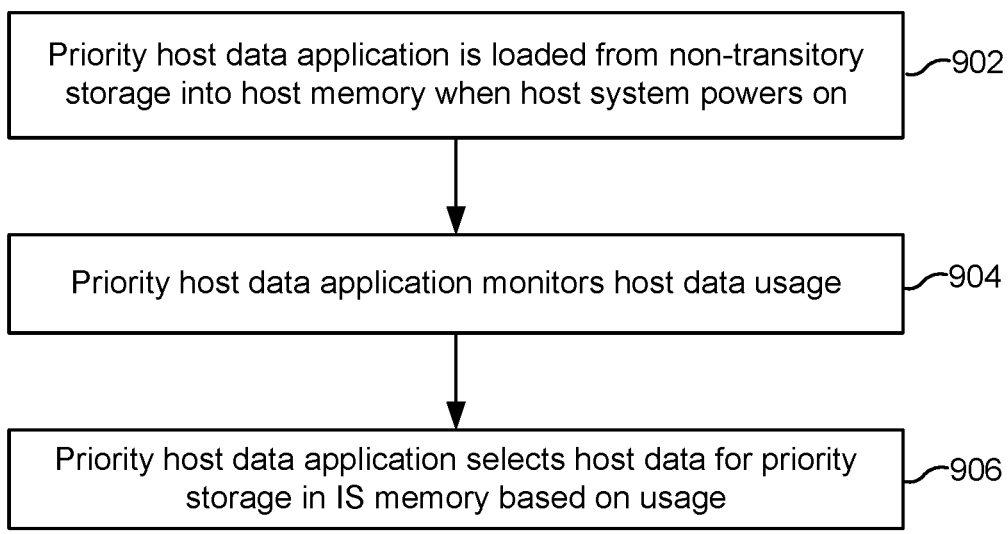
FIG. 9 is a flowchart of a process of a priority host data application determining what host data is to receive priority to remain in IS memory.

FIG. 9 is a flowchart of a process 900 of a priority host data application 164 determining what host data 130 is to receive priority to remain in IS memory 132. Process 900 is one embodiment of step 512 of process 500.

Step 902 includes the priority host data application 164 being loaded from non-transitory storage into host memory 160 upon the host system 140 being powered on. The non-transitory storage could be, for example, non-volatile memory in structure 126 on a memory die 108 in memory system 100. However, the non-transitory storage could be located elsewhere.

Step 904 includes the priority host data application 164 monitoring host data usage. A wide variety of techniques can be used to monitor host data usage. The monitoring techniques are not critical. In one embodiment, the priority host data application 164 monitors which files and/or programs are accessed from non-volatile storage device 100. In one embodiment, the priority host data application 164 monitors which files and/or programs are loaded into host memory 160.

Step 906 includes the priority host data application 164 selecting host data for priority storage in IS memory 132 based on host data usage. Step 906 could include adding a set of priority addresses to a stored record of priority host data. Thus, note that the priority host data application 164 could maintain a priority address table that is similar to table 144 that is maintained by one embodiment of memory controller 122. Step 906 could include removing a set of priority addresses from a record of priority host data.

Figure 10A:
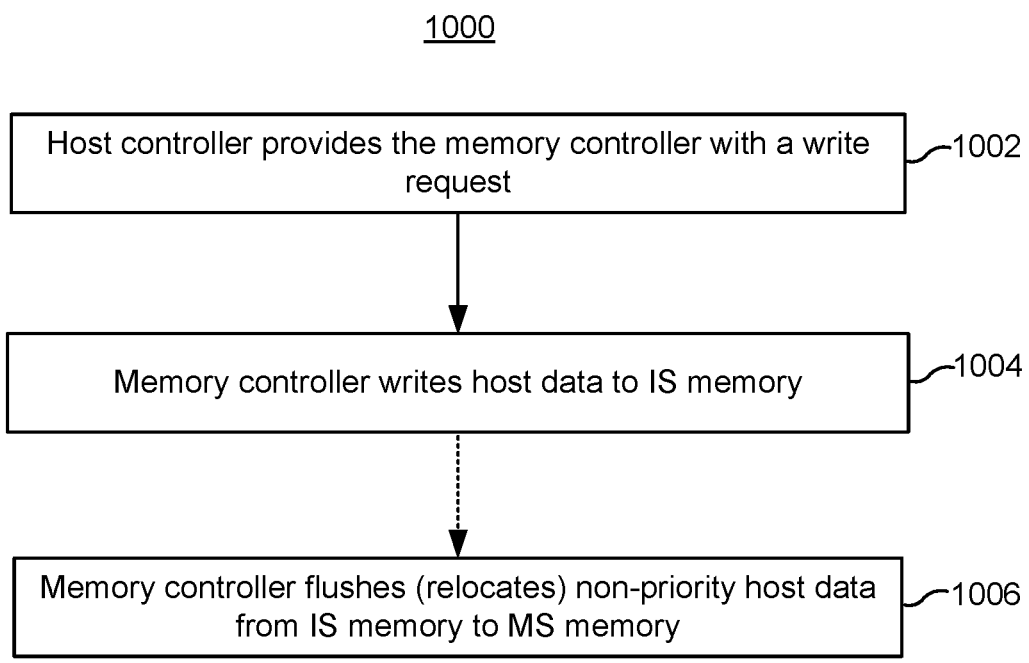
FIG. 10A is a flowchart of one embodiment of a process of a memory controller managing IS memory based on a priority address table.

FIG. 10A is a flowchart of one embodiment of a process 1000 of a memory controller 122 managing IS memory 132 based on a priority address table 144. Step 1002 includes a host controller providing the memory controller 122 with a write request. The write request specifies one or more logical address, in one embodiment. For example, the write request could have a starting logical block address (LBA) and a length of data to be written. The length might be specified in a number of logical blocks. The size of a logical block is specified by the host controller, in one embodiment. The host controller might specify the size of a logical block during initialization of the memory controller 122. Step 1002 may also include the host controller providing host data to be stored in the non-volatile memory system 100 for the write request. The host data could be provided to the memory controller 122 by the host controller specifying one or more host data buffers in host memory 160, which stores the host data. As one example, the host controller might put the write command on a command queue (which might be in host memory 160 or RAM 122b on memory system 100). The write command could include a pointer to a data buffer in host memory 160, as well as a pointer to data buffer pointers. For example, in the NVMe protocol the host controller can include a pointer in a write command, wherein the pointer points to a list of data buffer pointers. Each data buffer pointer may point to a data buffer in host memory 160. There are many other alternatives for the host system to provide host data to the memory controller 122.

Step 1004 includes the memory controller 122 writing the host data to IS memory 132. Note that in this embodiment, both priority host data and non-priority host data may be written to IS memory 132. However, as will be discussed below, it is not required to store the non-priority host data in IS memory 132 in response to a request from host 140 to store the non-priority data to the non-volatile storage device 100.

The dashed line between step 1004 and 1006 indicates that the memory controller 122 may perform other tasks between these steps. Step 1006 includes the memory controller flushing non-priority host data from IS memory 132 to MS memory 134. The flush might be triggered by the amount of free IS memory 132 dropping below a threshold. Note that step 1006 may also include keeping priority host data in IS memory 132. Note that the decision of which host data to keep in IS memory 132 and which to relocate to MS memory 134 is based on the priority addresses, in one embodiment. Hence, unlike techniques that may relocate "older" host data, such "older" data may remain in IS memory 132, depending on its priority.

Figure 10B:
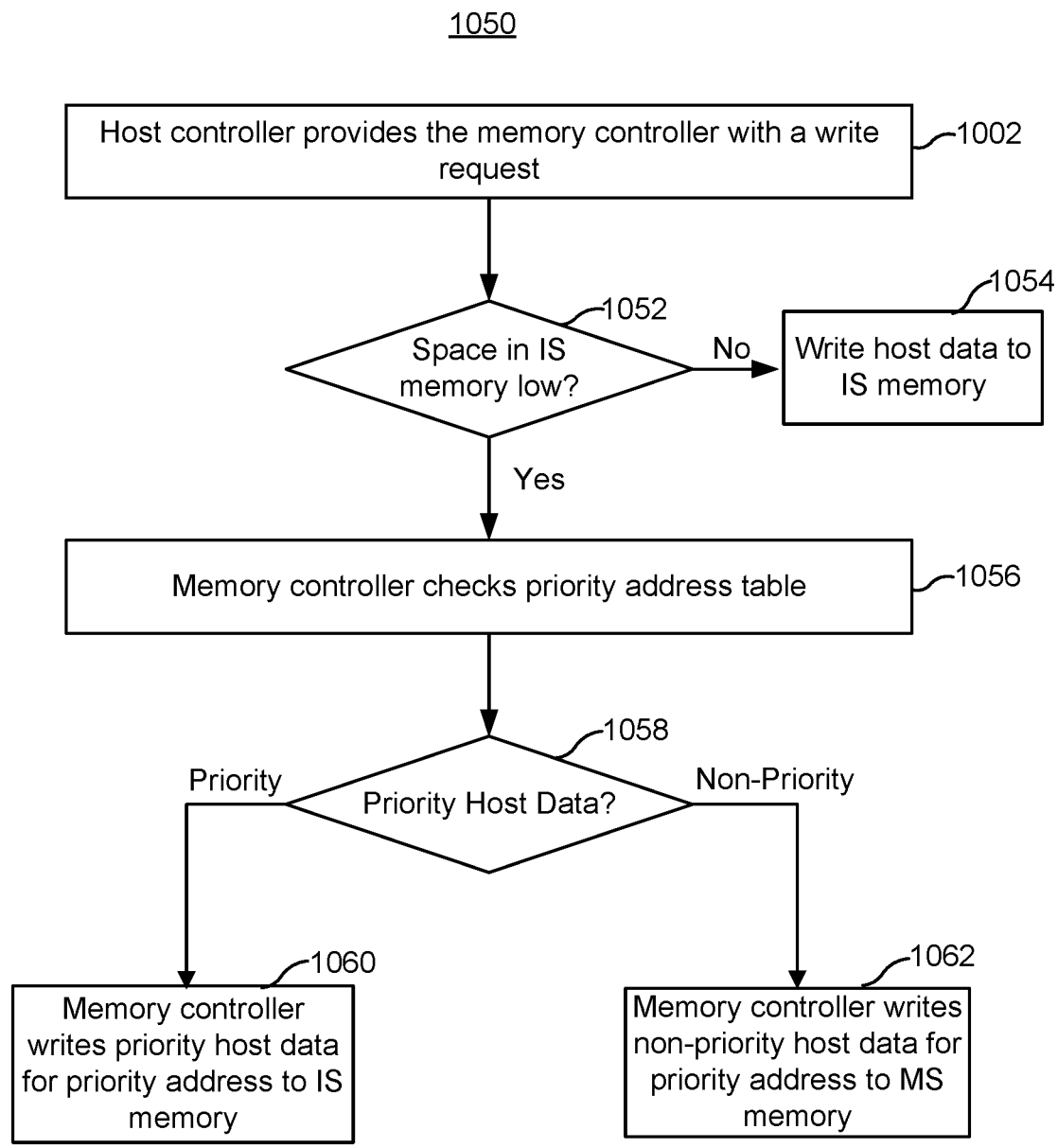
FIG. 10B is a flowchart of one embodiment of a process of a memory controller managing IS memory based on a priority address table in which it is possible for non-priority host data to be written directly to MS memory (bypassing IS memory).

It is not required that the non-priority host data be stored in IS memory 132 in response to a request from the host 140 to store the non-priority host data. FIG. 10B is a flowchart of one embodiment of a process 1050 of a memory controller 122 managing IS memory 132 based on a priority address table 144 in which it is possible for non-priority host data to be written directly to MS memory 132 (bypassing IS memory 132).

Step 1002 includes a host controller providing the memory controller 122 with a write request. Step 1052 is a determination as to the amount of free space in IS memory 132. If space is not low, then the host data may be written to the IS memory, in step 1054.

Step 1056 includes the memory controller 122 checking the priority address table 144 with respect to the write request. As noted, the write request has a starting logical address and length, in one embodiment. Thus, the write request, in effect, specifies a range of logical addresses (e.g., LBAs), in one embodiment. The memory controller 122 determines whether any of the logical addresses in this range are in the priority address table 144, in one embodiment of step 1058. The memory controller 122 may perform step 1060 for logical addresses found in table 144. The memory controller 122 may perform step 1062 for logical addresses not found in table 144.

Step 1060 includes the memory controller 122 writing the priority host data for the priority address to IS memory 132.

Step 1062 includes the memory controller 122 writing the non-priority host data for the non-priority address to MS memory 134.

Note that for a given write request from host 140, none, some, or all of the host data could be written to MS memory 134 without being written to IS memory 132, in one embodiment. In the event that some of all of the host data is written to MS memory 134 without being written to IS memory 132, this can save space in the IS memory 132, which could avoid the need to relocate priority host data from IS memory 132. Note that some conventional FIFO techniques might relocate host data in order to make room for host data that is being newly written to the memory system 100.

One alternative to process 1050 is to simply write non-priority host data to MS memory 134 even when space in IS memory 132 is not low. Because a write to MS memory 134 may take longer than a write to IS memory 132, this option might only be performed if writing the non-priority host data directly to MS memory 134 does not have a significant negative impact on write throughput (e.g., the amount of data written per unit time).

Figure 11:
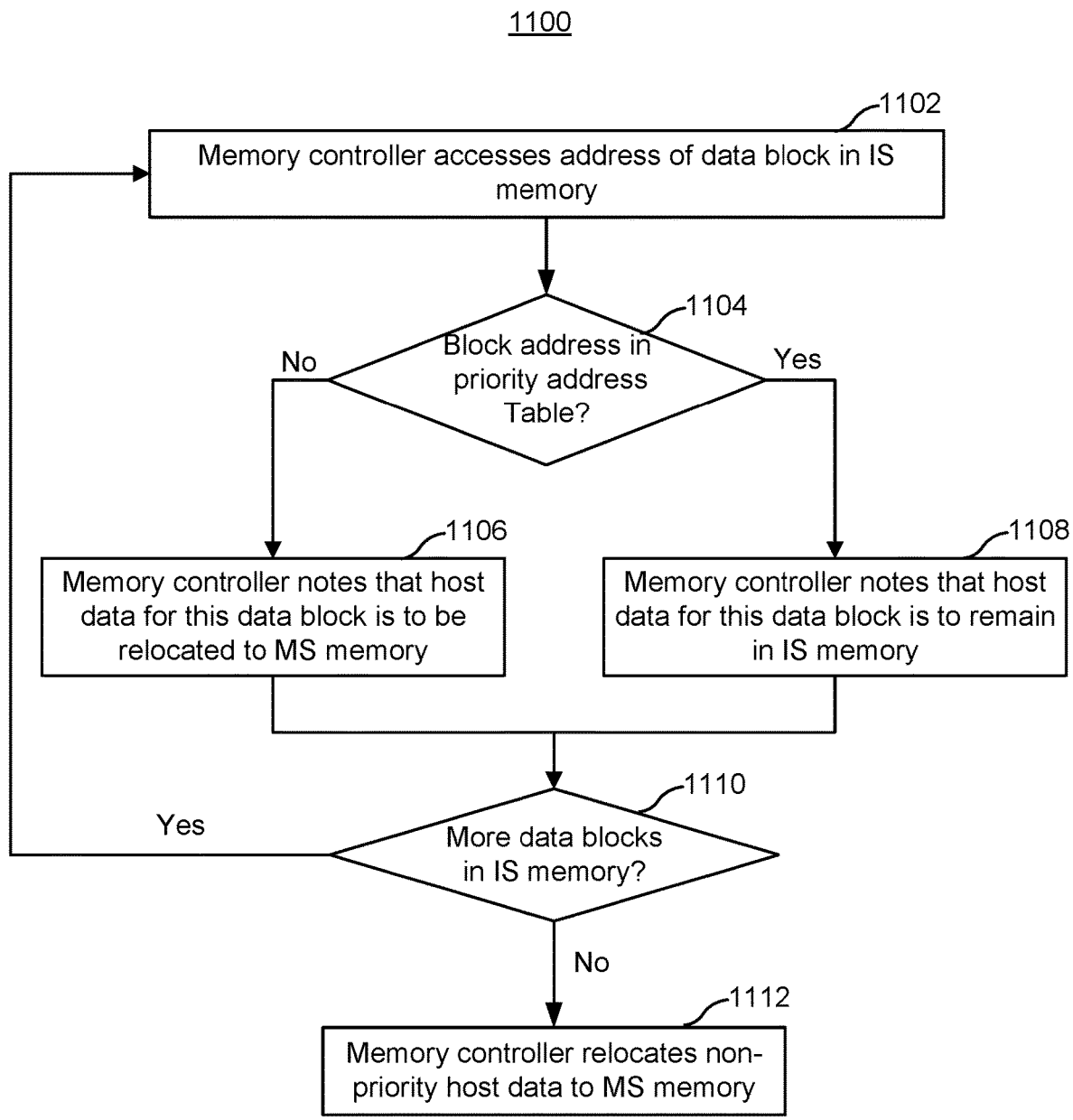
FIG. 11 is a flowchart of one embodiment of a process of a relocation (or flush) operation based on priority addresses.

FIG. 11 is a flowchart of one embodiment of a process 1100 of a relocation (or flush) operation based on priority addresses. Process 1100 is one embodiment of step 404 of process 400. Process 1100 is one embodiment of step 520 of process 500. Process 1100 may be performed during one embodiment of step 1006 of process 1000. Process 1100 may be performed in response to the memory controller 122 determining that the IS memory 132 is to be flushed. This may be performed when the IS memory 132 reaches a certain percentage of its capacity, as one example. Process 1100 describes processing of one data block in IS memory 132. The data block has a logical address, such as a logical block address. In one embodiment, a data block is a unit of data that is associated with one logical address (e.g. LBA). The data block could be of any size. Note that a data block is a distinct concept from an "erase block," which is discussed below in connection with garbage collection. An erase block is defined herein as a unit of data that is erased together. The erase block can be of any size. In some cases, there are multiple data blocks per erase block.

Step 1102 includes the memory controller 122 accessing the logical address (e.g., LBA) of a data block in the IS memory 132.

Step 1104 includes a determination of whether the logical address is in the priority address table 144. Step 1106 is performed if the logical address is in not the priority address table 144. Step 1106 includes noting that the host data for this data block is to be transferred to MS memory 134. Thus, this host data has been identified as non-priority host data.

Step 1108 is performed if logical address is in the priority address table 144. Step 1108 includes noting that the host data for this data block is to remain in the IS memory 132. Thus, this host data has been identified as priority host data.

Step 1110 includes a determination of whether there are more data blocks in the IS memory 132 to consider. If so, another data block is considered in step 1102 (and further steps). Thus, the memory controller 122 may build a list of host data to be relocated to MS memory 134 by performing steps 1102-1108 for various data blocks in IS memory 132. In other words, the memory controller 122 may build a list of non-priority data (as well as the location in IS memory 132). The location could be identified based on logical address or physical address.

When all data blocks in the IS memory 132 are processed, the memory controller 122 transfers non-priority host data that is to be relocated to MS memory 132. Note that step 1112 could be performed prior to processing of all of the data blocks in the IS memory 132. Note that process 1100 keeps priority host data in IS memory 132 over non-priority host data, even if the non-priority host data is "newer" than the priority host data. This can improve performance by, for example, allowing the priority host data to be read faster (relative to if the priority host data had been relocated to MS memory 134).

Figure 12:
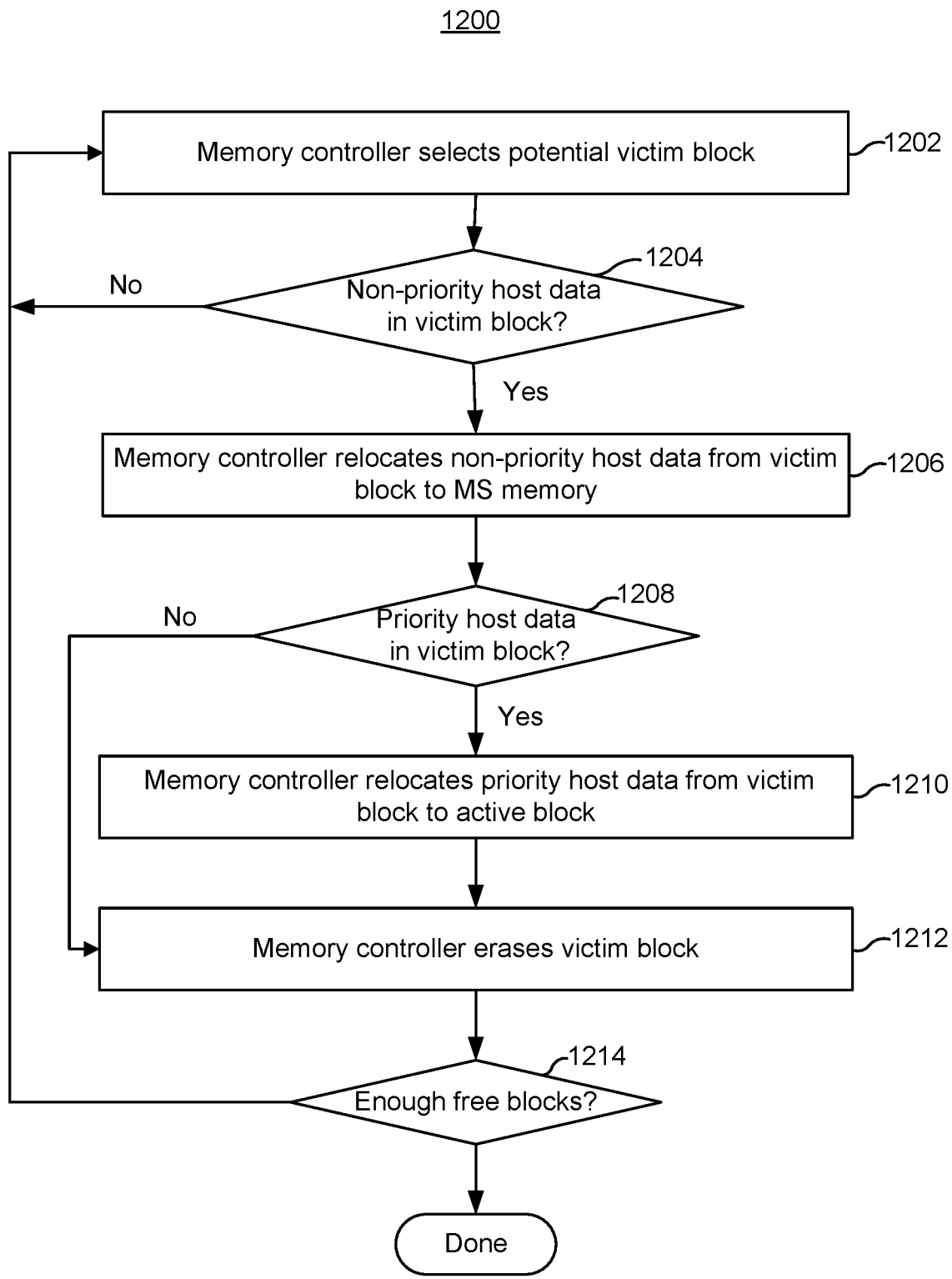
FIG. 12 is a flowchart of one embodiment of a process of a memory controller performing garbage collection based on a priority address table.

FIG. 12 is a flowchart of one embodiment of a process 1200 of a memory controller 122 performing garbage collection based on a priority address table 144. Process 1200 is one embodiment of step 404 of process 400. Process 1200 is one embodiment of step 520 of process 500.

Step 1202 includes the memory controller 122 selecting a potential victim block. A "victim block" is a block of memory cells that will be erased in the garbage collection process. A "potential victim block" is one that might or might not be erased in the garbage collection process. Note that the potential victim block could contain both priority host data and non-priority host data. In some cases, the potential victim block might contain priority host data, but no non-priority host data. In some cases, the potential victim block might contain non-priority host data, but no priority host data. In one embodiment, only blocks that contain non-priority data are erased in the garbage collection process. In other words, a potential victim block that contains priority host data, but no non-priority host data is not erased in one embodiment of a garbage collection process. The potential victim block is an "erase block," in one embodiment. An erase block is a block that is erased as one unit.

Step 1204 is a determination of whether there is non-priority host data in the potential victim block. The memory controller 122 compares logical addresses of host data in the potential victim block with the logical address table 144 to make this determination. If there is no non-priority host data in the potential victim block, then processing of this potential victim block concludes in one embodiment. Hence, the memory controller 122 may select another potential victim block in step 1202.

In the event that the potential victim block contains non-priority host data, then step 1206 is performed. If step 1206 is performed, then the block is no longer referred to as a "potential victim block," but is referred to as a "victim block." Step 1206 includes the memory controller 122 transferring non-priority host data from the victim block to MS memory 132. Note that the memory controller 122 could collect non-priority data from more than one victim block prior to transferring the non-priority data to MS memory 132.

Step 1208 includes a determination of whether the victim block contains priority host data. The memory controller 122 compares logical addresses of host data in the victim block with the logical address table 144 to make this determination.

If there is priority host data in the victim block, then control passes to step 1210. Step 1210 includes the memory controller 122 transferring priority host data from the victim block to an active block. It is possible that the active block did not contain any valid data prior to the start of the garbage collection process, but that is not a requirement. An "active block" is a block that will contain valid data after the garbage collection process. The active block is an erase block, in one embodiment. After step 1210, control passes to step 1212 to erase the victim block.

Also, returning to the discussion of step 1208, if there is not any priority host data in the victim block, then control also passes to step 1212 to erase the victim block. As noted above, the victim block might not contain any priority host data, in which case step 1210 would not be performed for this victim block.

Returning again to the discussion of step 1212, after the victim block is erased, the victim block may be returned to a pool of "free blocks." When the memory controller 122 wishes to write new host data to the IS memory 132, the memory controller 122 may select one of the free blocks.

Step 1214 is a determination of whether there are enough free blocks in the IS memory 132. If so, the process may end. If there are not enough free blocks, the memory controller 122 may select another potential victim block at step 1202.

A first embodiment disclosed herein includes an apparatus comprising: non-volatile memory cells; and a memory controller coupled to the non-volatile memory cells. The memory controller configured to: designate a first group of the non-volatile memory cells as intermediate storage for host data from a host system and a second group of the non-volatile memory cells as main storage for host data from the host system. The intermediate storage has a lower read latency than a read latency of the main storage. The memory controller configured to receive priority addresses from the host system that identifies host data to have priority to remain in the intermediate storage. The memory controller configured to give host data having the priority addresses priority to remain in the intermediate storage.

In a second embodiment, and in furtherance of the first embodiment, the memory controller is further configured to manage whether the host data remains in the first group of non-volatile memory cells or is relocated to the second group of non-volatile memory cells based on the priority addresses.

In a third embodiment, and in furtherance of the first or second embodiments, the memory controller is further configured to select host data for relocation from the intermediate storage to the main storage based on the priority addresses, including relocate host data having an address other than one of the priority addresses from the first group of the non-volatile memory cells to the second group of the non-volatile memory cells.

In a fourth embodiment, and in furtherance of any of the first to third embodiments, the memory controller is further configured to perform garbage collection within the first group of the non-volatile memory cells based on the priority addresses, including the memory controller being configured to keep host data having the priority addresses in the intermediate storage and relocate host data not having one of the priority addresses to the main storage.

In a fifth embodiment, and in furtherance of any of the first to fourth embodiments, the memory controller is further configured to: program the first group of the non-volatile memory cells to a single bit per memory cell; and program the second group of the non-volatile memory cells to multiple bits per memory cell.

In a sixth embodiment, and in furtherance of any of the first to fifth embodiments, the apparatus further comprises the host system having non-transitory storage having stored therein an application. The host system further comprises a processor in communication with the non-transitory storage. The application which when executed on the processor makes a request to an operating system application programming interface (API) in order to provide the priority addresses to the memory controller with the indication that the host data for the priority addresses is to receive priority to remain in the intermediate storage.

In a seventh embodiment, and in furtherance of the sixth embodiment, the application which when executed on the processor: monitors usage of host data; and selects host data for priority storage in the first group of the non-volatile memory cells based on the usage of host data.

In an eighth embodiment, and in furtherance of the sixth or seventh embodiments, the application which when executed on the processor: provides a user interface that allows selection of host data for priority storage in the intermediate storage; receives a selection of host data in the user interface; accesses a set of addresses for the host data selected in the user interface; and provides the set of addresses for the selected host data to the memory controller as a set of the priority addresses of the host data.

In a ninth embodiment, and in furtherance of any of the sixth to eighth embodiments, the application which when executed on the processor: provides a user interface that allows selection of a priority weight for a file, wherein the priority weight is a value selected from at least three possible weights; receives a selection in the user interface of a priority weight for a selected file; accesses a set of addresses for the selected file, the set of addresses being a set of the priority addresses; and provides the set of addresses to the memory controller as a set of the priority addresses of the host data with the priority weight with an indication that the set of addresses for the selected file are to have a priority to remain in first group of the non-volatile memory cells in accordance with the priority weight.

In a tenth embodiment, and in furtherance of any of the sixth to ninth embodiments, the apparatus further comprises: a communication interface coupled to the memory controller; and a device driver coupled to the communication interface. The device driver is configured to communicate with the memory controller using a non-volatile memory access protocol. The application which when executed on the processor provides the priority addresses to the memory controller using in-band communication that includes the device driver and the memory controller communicating using the non-volatile memory access protocol.

In an eleventh embodiment, and in furtherance of any of the first to tenth embodiments, the first group of non-volatile memory cells comprise one or more of ReRAM memory cells, Phase-Change Memory (PCM) memory cells, or Magnetic RAM memory cells.

One embodiment includes a method of operating a non-volatile memory system comprising a host system and a non-volatile storage device that are connected by a communication link. The non-volatile storage device comprises a memory controller and non-volatile memory cells. The method comprising: storing host data into intermediate storage comprising a first group of the non-volatile memory cells at one bit per non-volatile memory cell; storing host data into main storage comprising a second group of the non-volatile memory cells at multiple bits per non-volatile memory cell; providing, from the host system over the communication link to the memory controller, one or more requests containing priority logical addresses for which host data is to receive priority to remain in the intermediate storage over host data that does not have a priority logical address; and giving priority, by the memory controller, to host data for the priority logical addresses in the requests to remain in the intermediate storage over host data that does not have one of the priority logical addresses.

One embodiment includes non-volatile memory system comprising a host system and a non-volatile storage device having non-volatile memory cells, comprising: programming means for storing host data into intermediate storage that comprises a first group of the non-volatile memory cells at one bit per non-volatile memory cell and for storing host data into main storage that comprises a second group of the non-volatile memory cells at multiple bits per non-volatile memory cell; priority host data selection means for selecting priority host data to receive priority to remain in the intermediate storage; priority host data providing means further for providing, to the non-volatile storage device, priority logical addresses for the priority host data with an indication that the priority host data for the priority logical addresses is to receive priority to remain in the intermediate storage; priority address storing means for storing the priority logical addresses in a priority address table in the non-volatile storage device; and memory controller means for giving priority to priority host data having any of the priority logical addresses in the priority address table to remain in the intermediate storage over host data having a logical address that is not in the priority address table.

In one embodiment programming means comprises one or more of memory controller 122, processor 122c, state machine 112, on-chip address decoder 114, power control 116, decoders 124/132, read/write circuits 128, back end module. The programming means may comprise other hardware and/or software (e.g., code that when executed on a processor implements all or a portion of the programming means).

In one embodiment priority host data selection means comprises one or more of host processor 150, and/or priority host data application 164 (which may be code that is executed on processor 150). The priority host data selection means may comprise other hardware and/or software (e.g., code that when executed on a processor implements all or a portion of the priority host data selection means).

In one embodiment priority host data providing means comprises one or more of host processor 150, priority host data application 164, O/S APIs 166, file system 168, device drivers 170. The priority host data providing means may comprise other hardware and/or software (e.g., code that when executed on a processor implements all or a portion of the priority host data providing means).

In one embodiment priority address storing means comprises one or more of memory controller 122, processor 122c, RAM 122b, buffer management/bus control 314, intermediate storage management control 334. The priority address storing means may comprise other hardware and/or software (e.g., code that when executed on a processor implements all or a portion of the priority address storing means).

In one embodiment memory controller means comprises one or more of memory controller 122, processor 122c, intermediate storage management control 334. The memory controller means may comprise other hardware and/or software (e.g., code that when executed on a processor implements all or a portion of the memory controller means).

One embodiment further includes device driver means for receiving the priority logical addresses that were provided to the API, the device driver means further being for providing the priority logical addresses to the memory controller means. The device driver means may comprise one or more of host processor 150, device drivers 170. The device driver means may comprise other hardware and/or software (e.g., code that when executed on a processor implements all or a portion of the device driver means).

Any of the above means (e.g., programming means, priority host data selection means, priority host data providing means, priority address storing means, memory controller means, device driver means) may include a packaged functional hardware unit (e.g., an electrical circuit), program code (e.g., software or firmware) executable by one or more processors or processing circuitry that usually performs a particular function of related functions, or a self-contained hardware or software component that interfaces with a larger system. For example, of the above means may include may include an application specific integrated circuit (ASIC), a Field Programmable Gate Array (FPGA), an electrical circuit, a digital logic circuit, an analog circuit, a combination of discrete circuits, gates, or any other type of hardware or combination thereof.

For the purpose of this document, the terms "write" and "store" are often used interchangeably, as are the terms "writing" and "storing."

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the terms "based on" and "in dependence on" may be read as "based at least in part on."

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments, but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
   non-volatile memory cells; and
   a memory controller coupled to the non-volatile memory cells, the memory controller configured to:
      designate a first group of the non-volatile memory cells as intermediate storage for host data from a host system and a second group of the non-volatile memory cells as main storage for host data from the host system, wherein the intermediate storage has a lower read latency than a read latency of the main storage;
      receive a request to write to a reserved logical address, the write request either containing data or a pointer to data;
      access priority addresses from the data in the write request or pointed to by the write request, the priority addresses identify host data to have priority to remain in the intermediate storage;
      update a priority address table in response to the request to write to the reserved logical address, including store the priority addresses in the priority address table; and
      give host data having the priority addresses in the priority address table priority to remain in the intermediate storage.

2. The apparatus of claim 1, wherein the memory controller is further configured to:
   manage whether the host data remains in the first group of the non-volatile memory cells or is relocated to the second group of the non-volatile memory cells based on the priority addresses in the priority address table.

3. The apparatus of claim 1, wherein the memory controller is further configured to:
   select host data for relocation from the intermediate storage to the main storage based on the priority addresses in the priority address table, including relocate host data having an address other than one of the priority addresses from the first group of the non-volatile memory cells to the second group of the non-volatile memory cells.

4. The apparatus of claim 1, wherein the memory controller is further configured to perform garbage collection within the first group of the non-volatile memory cells based on the priority addresses in the priority address table, including the memory controller being configured to keep host data having the priority addresses in the intermediate storage and relocate host data not having one of the priority addresses to the main storage.

5. The apparatus of claim 1, wherein the memory controller is further configured to:
   program the first group of the non-volatile memory cells to a single bit per memory cell; and program the second group of the non-volatile memory cells to multiple bits per memory cell.

6. The apparatus of claim 1, further comprising the host system having non-transitory storage having stored therein an application, wherein the host system further comprises a processor in communication with the non-transitory storage, wherein the application which when executed on the processor makes the request to write to the reserved logical address to an operating system application programming interface (API) in order to provide the priority addresses to the memory controller with an indication that the host data for the priority addresses is to receive priority to remain in the intermediate storage.

7. The apparatus of claim 6, wherein the application which when executed on the processor:
monitors usage of host data; and
selects host data for priority storage in the first group of the non-volatile memory cells based on the usage of host data.

8. The apparatus of claim 6, wherein the application which when executed on the processor:
provides a user interface that allows selection of host data for priority storage in the intermediate storage;
receives a selection of host data in the user interface;
accesses a set of addresses for the host data selected in the user interface; and
provides the set of addresses for the selected host data to the memory controller in the data in the write request or pointed to by the write request as a set of the priority addresses of the host data.

9. The apparatus of claim 6, wherein the application which when executed on the processor:
provides a user interface that allows selection of a priority weight for a file, wherein the priority weight is a value selected from at least three possible weights;
receives a selection in the user interface of a priority weight for a selected file;
accesses a set of addresses for the selected file, the set of addresses being a set of the priority addresses; and
provides the set of addresses to the memory controller in the data in the write request or pointed to by the write request as a set of the priority addresses of the host data with the priority weight with an indication that the set of addresses for the selected file are to have a priority to remain in first group of the non-volatile memory cells in accordance with the priority weight.

10. The apparatus of claim 6, further comprising:
a communication interface coupled to the memory controller; and
a device driver coupled to the communication interface, the device driver being configured to communicate with the memory controller using a non-volatile memory access protocol, wherein the application which when executed on the processor provides the priority addresses to the memory controller via the write request using in-band communication that includes the device driver and the memory controller communicating using the non-volatile memory access protocol.

11. The apparatus of claim 1, wherein the first group of the non-volatile memory cells comprise one or more of ReRAM memory cells, Phase-Change Memory (PCM) memory cells, or Magnetic RAM memory cells.

12. A method of operating a non-volatile memory system comprising a host system and a non-volatile storage device that are connected by a communication link, the non-volatile storage device comprising a memory controller and non-volatile memory cells, the method comprising:

storing host data into intermediate storage comprising a first group of the non-volatile memory cells at one bit per non-volatile memory cell;
storing host data into main storage comprising a second group of the non-volatile memory cells at multiple bits per non-volatile memory cell;
providing, from the host system over the communication link to the memory controller, one or more requests containing priority logical addresses for which host data is to receive priority to remain in the intermediate storage over host data that does not have a priority logical address, wherein the one or more requests comprise an instruction to write data to a reserved logical address, the one or more requests either containing the priority logical addresses or pointing to the priority logical addresses; and
updating, by the memory controller, a priority address table in response to the request to write to the reserved logical address, including writing the priority logical addresses to the priority address table; and
giving priority, by the memory controller, to host data for the priority logical addresses in the priority address table to remain in the intermediate storage over host data that does not have one of the priority logical addresses.

13. The method of claim 12, wherein giving priority to host data for the priority logical addresses in the requests to remain in the intermediate storage comprises:
flushing, from the first group of the non-volatile memory cells to the second group of the non-volatile memory cells, host data having a non-priority logical address that is not one of the priority logical addresses.

14. The method of claim 12, wherein giving priority to host data for the priority logical addresses in the requests to remain in the intermediate storage comprises:
performing garbage collection within the first group of the non-volatile memory cells based on the priority logical addresses, including transferring host data having a non-priority logical address that is not one of the priority logical addresses from the first group of the non-volatile memory cells to the second group of the non-volatile memory cells.

15. The method of claim 12, further comprising:
providing the one or more requests to an operating system application programming interface (API) of the host system to forward the one or more requests to the memory controller.

16. The method of claim 12, wherein the one or more requests comprise in-band communication using a memory access protocol.

17. A non-volatile memory system comprising a host system and a non-volatile storage device having non-volatile memory cells, comprising:
programming means for storing host data into intermediate storage that comprises a first group of the non-volatile memory cells at one bit per non-volatile memory cell and for storing host data into main storage that comprises a second group of the non-volatile memory cells at multiple bits per non-volatile memory cell;
priority host data selection means for selecting priority host data to receive priority to remain in the intermediate storage;
priority host data providing means for providing, to the non-volatile storage device, priority logical addresses for the priority host data with an indication that the priority host data for the priority logical addresses is to receive priority to remain in the intermediate storage, the priority logical addresses provided in data to be written to a reserved logical address;

priority address storing means for accessing the priority logical addresses in the data to be written to the reserved logical address and storing the priority logical addresses in a priority address table in the non-volatile storage device without writing any host data to the non-volatile memory cells; and memory controller means for giving priority to priority host data having any of the priority logical addresses in the priority address table to remain in the intermediate storage over host data having a logical address that is not in the priority address table.

18. The non-volatile memory system of claim 17, wherein the priority host data providing means is further for:

providing the priority logical addresses to an operating system application programming interface (API) with instructions to have the memory controller means write the priority logical addresses to the reserved logical address.

19. The non-volatile memory system of claim 18, further comprising:

device driver means for receiving the priority logical addresses that were provided to the API, the device driver means further being for providing the priority logical addresses to the memory controller means via a request to write to the reserved logical address.

20. An apparatus comprising:

a host system having non-transitory storage having stored therein an application, wherein the host system further comprises a processor in communication with the non-transitory storage;

non-volatile memory cells; and a memory controller coupled to the non-volatile memory cells, the memory controller configured to:

designate a first group of the non-volatile memory cells as intermediate storage for host data from the host system and a second group of the non-volatile memory cells as main storage for host data from the host system, wherein the intermediate storage has a lower read latency than a read latency of the main storage;

receive a request from the host system to write to a reserved logical address, the write request either containing data or a pointer to data;

access priority addresses from the data in the write request or pointed to by the write request, the priority addresses identify host data to have priority to remain in the intermediate storage; and give host data having the priority addresses priority to remain in the intermediate storage;

and wherein the application which when executed on the processor makes the request to write to the reserved logical address to an operating system application programming interface (API) in order to provide the priority addresses to the memory controller with an indication that the host data for the priority addresses is to receive priority to remain in the intermediate storage, wherein the application which when executed on the processor:

provides a user interface that allows selection of a priority weight for a file, wherein the priority weight is a value selected from at least three possible weights;

receives a selection in the user interface of a priority weight for a selected file;

accesses a set of addresses for the selected file, the set of addresses being a set of the priority addresses; and provides the set of addresses to the memory controller in the data in the write request or pointed to by the write request as a set of the priority addresses of the host data with the priority weight with an indication that the set of addresses for the selected file are to have a priority to remain in first group of the non-volatile memory cells in accordance with the priority weight.

* * * * *